(12) United States Patent
Tian

(10) Patent No.: US 12,539,964 B2
(45) Date of Patent: Feb. 3, 2026

(54) WING-AND-ROTARY-WING MIXED FOLDING AND UNFOLDING SYSTEM OF FLYING VEHICLE, AND FLYING VEHICLE

(71) Applicant: Fengnian Tian, Wuhan (CN)

(72) Inventor: Fengnian Tian, Wuhan (CN)

( * ) Notice: Subject to any disclaimer, the term of this patent is extended or adjusted under 35 U.S.C. 154(b) by 0 days.

(21) Appl. No.: 18/512,046

(22) PCT Filed: Jul. 19, 2022

(86) PCT No.: PCT/CN2022/106572
§ 371 (c)(1),
(2) Date: Nov. 17, 2023

(87) PCT Pub. No.: WO2023/001157
PCT Pub. Date: Jan. 26, 2023

(65) Prior Publication Data
US 2024/0101251 A1  Mar. 28, 2024

(30) Foreign Application Priority Data
Jul. 22, 2021 (CN) .......................... 202110832759.6

(51) Int. Cl.
*B64C 27/22* (2006.01)
*B64C 3/56* (2006.01)
*B64C 27/52* (2006.01)

(52) U.S. Cl.
CPC ................ *B64C 27/22* (2013.01); *B64C 3/56* (2013.01); *B64C 27/52* (2013.01)

(58) Field of Classification Search
CPC ........... B64C 3/56; B64C 27/22; B64U 20/50; B64U 30/293
See application file for complete search history.

(56) References Cited

U.S. PATENT DOCUMENTS

| | | | | |
|---|---|---|---|---|
| 1,890,354 | A * | 12/1932 | Armour | B64C 3/56 244/49 |
| 2015/0203193 | A1 * | 7/2015 | Cox | B64D 27/00 244/50 |
| 2018/0079485 | A1 * | 3/2018 | Kooiman | B64C 29/0033 |
| 2021/0107640 | A1 * | 4/2021 | Baity | B64U 50/13 |

* cited by examiner

*Primary Examiner* — Ashesh Dangol
(74) *Attorney, Agent, or Firm* — Addison D. Ault; IPGentleman Intellectual Property Services, LLC

(57) ABSTRACT

A hybrid foldable system of wings and rotors of a flying vehicle, and a flying vehicle. The flying vehicle includes a vehicle body, two wings, wing rotating mechanisms, rotor supports, rotor support rotating mechanisms, and rotor assemblies. The wings are movably connected to the vehicle body and the wing rotating mechanisms drive the wings to rotate to expand or retract. The rotor assemblies expand to two sides of each wing, or reversely rotate to retract to inner sides of each wing. Vertical taking-off and landing and stable flight in the air of the flying vehicle can be realized. In addition, when running on the ground, the wing and the rotor assemblies can be rotationally folded and placed on the inner sides of the vehicle body, so that space is reduced, and the limit requirements of urban roads regarding the size of the vehicle are satisfied.

7 Claims, 23 Drawing Sheets

WING-AND-ROTARY-WING MIXED FOLDING AND UNFOLDING SYSTEM OF FLYING VEHICLE, AND FLYING VEHICLE

CROSS-REFERENCE TO RELATED APPLICATION

This application is a Section 371 National Stage Application of International Application No. PCT/CN2022/106572, filed on Jul. 19, 2022, entitled "WING-AND-ROTARY-WING MIXED FOLDING AND UNFOLDING SYSTEM OF FLYING VEHICLE, AND FLYING VEHICLE", which claims priority to Chinese Application No. 202110832759.6, filed on Jul. 22, 2021, incorporated herein by reference in their entirety.

TECHNICAL FIELD

The present disclosure relates to the field of aircraft and automobile design, and in particular to a hybrid foldable system of wings and rotors of a flying vehicle, and a flying vehicle.

BACKGROUND

At present, urban traffic congestion has become a common problem worldwide. On the one hand, the number of vehicles running on the ground continues to increase, urban traffic pressure is increasing, and traffic congestion occurs frequently; on the other hand, the ground space is limited, and it is difficult to balance people, vehicles, and ground space, resulting in people's increasing demand for air transportation.

SUMMARY

Technical Problem

The currently published flying vehicle concepts and patented technologies mainly focus on the following three aspects: first, a flying vehicle that takes off and lands vertically based on a multi-rotor layout, it has the advantages of small occupied area and capability of takeoff and landing at any time, but the disadvantage is that the endurance time and mileage are short; second, a flying vehicle based on a fixed-wing layout, it has the advantages of long endurance time and heavy load, but the disadvantage is that it requires a runway to complete takeoff and landing; third, a flying vehicle based on tilt-rotor or tilt-wing technology, it combines the advantages of multi-rotor and fixed-wing layouts, but the disadvantage is that the wings are larger in size.

In order to solve the above existing problems, for example, the Chinese patent application with application number CN201820928031.7 discloses a six-rotor arrangement structure of a tandem fixed-wing flying vehicle and the corresponding flying vehicle, including two front rotors, two rear rotors, a tail rotor and a head rotor. The two front rotors and the two rear rotors are symmetrically arranged on the left and right sides of the vehicle by means of the corresponding front and rear wings; the tail rotor is arranged behind the rear of the vehicle by means of a lower tail rod; the head rotor is arranged in front of the head of the vehicle by means of a head link rod. The six rotors thereof work together to provide the flying vehicle with upward flight power and the power to maintain the vertical direction of flight. The power generated by the rotors offsets the gravity of the vehicle, allowing the vehicle to maintain balance in the air. The Chinese patent application with application number CN201820928120.1 discloses a single-wing four-rotor structure on a flying vehicle and the flying vehicle, which includes two side rotors, a tail rotor and a head rotor. The left and right sides of the vehicle body are symmetrically provided with wings extending horizontally outward, and a side rotor is provided below the middle part of the wing; the tail of the vehicle body is provided with a lower tail rod that extends horizontally backward, and a tail rotor is provided below the lower tail rod; the head of the vehicle body is equipped with a head link rod extending horizontally forward, and a head rotor is provided below the head link rod. It provides upward lift to the flying vehicle through the layout of four rotors around the vehicle body, allowing the flying vehicle to take off. The Chinese patent application with application number CN201820928117.X discloses a tandem double-wing foldable system of flying vehicle and the flying vehicle, including two front rotors and two rear rotors symmetrically located two sides of the vehicle body. Each front wing is provided with a front rotor near the end of the front wing, each rear wing is provided with a rear rotor near the end of the rear wing. The front wing can be rotated and retracted to a front wing compartment of the vehicle body, and the rear wing can be rotated and retracted to a rear wing compartment of the vehicle body. When the flying vehicle is flying, the front wing and rear wing are expanded, and the front rotor and rear rotor provide lift for flight. When the flying vehicle is driven on the road, the front and rear wings are rotated and retracted into the vehicle body, so that it's in line with the appearance requirement of the vehicle. The large number of wings in these three patent applications results in a more complex structure, while the small number of rotors may not necessarily meet the requirements for smooth lifting. Further, these technical solutions do not meet the requirement of how to occupy a small space and keep in a fixed state for the blades of the rotors while being in a vehicle-like structure. In short, these three patented technical solutions are not simple in structure, and the take-off and landing performance is not easy to control smoothly.

Therefore, how to provide a flying vehicle that saves space, has simple and smooth take-off and landing performance, and characteristic of smooth flight is an urgent problem that needs to be solved by those skilled in the art.

Technical Solutions

In order to solve the problems that the existing flying vehicle occupies a large area and lacks design integration of fixed-wing state, multi-rotor state, and vehicle state, embodiments of the present disclosure provide a hybrid foldable system of wings and rotors of a flying vehicle, and a flying vehicle.

In order to achieve the above objects, the present disclosure provides the following technical solution:

A hybrid foldable system of wings and rotors of a flying vehicle, comprising: a vehicle body, two wings on two sides of the vehicle body, wing rotating mechanisms, rotor supports, rotor support rotating mechanisms, and rotor assemblies, wherein the wings are movably connected to the vehicle body; the wings and the wing rotating mechanisms are symmetrically arranged on two sides of the vehicle body; the wing rotating mechanisms are configured for driving the wings to rotate to expand to the two sides of the vehicle body, or reversely rotate to retract to inner sides of the vehicle body, without exceeding the edges of the wings, that is, the conversion between the vehicle working state and the flight working state of the wings can be completed; after completing the conversion between the vehicle working state and the flight working state, the wings and the vehicle body are relatively fixed and cannot move relative to each other. Alternatively, the wings can also be fixed at any position during rotation; the rotor supports are movably connected to the wings, and the rotation of the rotor supports on surfaces of the wings is achieved by activating the rotor support rotating mechanisms to rotate the rotor supports. Optionally, the rotor support rotating mechanism drives the rotor support to rotate on the surface of the wing from a state parallel to a longitudinal axis of the vehicle body to a state perpendicular to the longitudinal axis of the vehicle body as the wing rotates, and can also rotate back in the opposite direction, that is, the conversion between the vehicle working state and the flight working state of the rotor assembly can be completed; alternatively, the rotor support can also be fixed at any position during the rotation to complete the conversion between the vehicle working state and the flight working state of the rotor assembly. After completing the conversion between the vehicle working state and the flight working state, the rotor support and the wing are relatively fixed and cannot move relative to each other. Optionally, the rotor support is a rod.

According to some embodiments of the present disclosure, the wings on the two sides of the vehicle body are arranged on the vehicle body close to the head of the vehicle body; one or more rotor supports are installed on each wing.

According to some embodiments of the present disclosure, the rotor support is an integral rotor support, and a rotation center point of the rotor support is arranged at any position between two ends of the rotor support.

According to some embodiments of the present disclosure, the rotor support is divided into two parts, so that the rotor support comprises a front rotor support and a rear rotor support; the front rotor support and the rear rotor support share a rotation center point, or the front rotor support and the rear rotor support are each provided with a rotation center point.

According to some embodiments of the present disclosure, the wing rotating mechanisms are configured for driving the wings to rotate through a steering engine, a pin, a gear, a pulley, a chain drive, a link rod or any combination thereof, the wings are driven to rotate to the two sides of the vehicle body, or reversely rotate into the inner sides of the vehicle body, or stay at any position during the rotation, by activating the wing rotating mechanisms.

According to some embodiments of the present disclosure, the rotor support rotating mechanism is driven through a steering engine, a pin, a gear, a pulley, a chain drive, a link rod or any combination thereof, wherein the rotation of the rotor support on the surface of the wing is realized by activating the rotor support rotating mechanism to rotate the rotor support.

According to some embodiments of the present disclosure, the surface of the wing comprises an upper surface and a lower surface, and the rotor support is disposed above the upper surface of the wing or below the lower surface of the wing.

According to some embodiments of the present disclosure, the rotor assembly comprises a motor and a rotor; the rotor is fixedly connected to an output shaft of the motor, and the motor is installed on the rotor support through a fixed device or a rotatable device. Optionally, the front rotor assembly of the flying vehicle is fixedly connected to the rotor support through a rotatable steering engine mechanism, and the rear rotor assembly is fixedly connected to the rotor support through a non-rotatable rotor support.

According to some embodiments of the present disclosure, one or more rotor assemblies are installed on each rotor support. Optionally, two rotor assemblies are installed on one rotor support.

The present disclosure also provides a flying vehicle, comprising the hybrid foldable system of wings and rotors according to any one of the above embodiments, wherein the flying vehicle further comprises a vertical wing and a horizontal wing arranged at a rear of the vehicle body, a vehicle steering system, a power assembly and a flight control operating mechanism; the steering system and the power assembly are installed at a bottom of the vehicle body; and the flight control stick is installed inside the vehicle body.

The steering system of the flying vehicle is installed on the front axle of the wheels, and the power assembly is installed on the rear axle.

The main driving position of the flying vehicle is equipped with a steering wheel and a flight control stick.

The rotary wing surface of the rotor may be driven by the steering engine mechanism, so it can stay at any position during the tilting and rotating process.

On the premise that it can provide sufficient lift, the size of the rotary wing is determined by two factors. First, the diameter of the rotary wing should be smaller than the length of the rotor support; second, if the rotor has a tilting and rotating function, it must be ensured that the radius of the rotary wing should be smaller than the height of the rotor from the ground.

Furthermore, when the flying vehicle is on the ground, the expansion of the rotor can be completed by manual pushing or by the drive motor directly swinging away. When the rotor needs to be folded and retracted, it can be done manually.

Beneficial Effects

According to the present disclosure, several rotors are driven to retract from both sides of the wing to the space within the wing surface through the rotation of the wing and the rotation of the rotor supports, thereby realizing the conversion of the flying vehicle from a flight state to a vehicle state. Through the rotation of the wing and the rotation of the rotor supports, several rotary wings are driven to expand from the space within the wing surface to both sides of the wing, meanwhile the wing expands, realizing the conversion of the flying vehicle from the vehicle state to the flight state. The structure is simple and the unfolding process is quick and orderly.

It can be seen from the above technical solutions that, compared with the existing technology, the present disclosure provides a flying vehicle with vertical take-off and landing, fixed wing, and vehicle mode. With the help of multiple rotary wings, it achieves a vertical take-off and landing function, so the runway length and take-off and landing time are saved. Through the tilting of the rotors and the combination of the wings, long-endurance fixed-wing flight can be achieved; through the rotation of the wing around the vehicle body, in conjunction with the rotation of the rotor support structure on the wing, a flying vehicle that occupies a small area and meets the requirements of road traffic regulations for vehicle size is realized.

Figure 1:
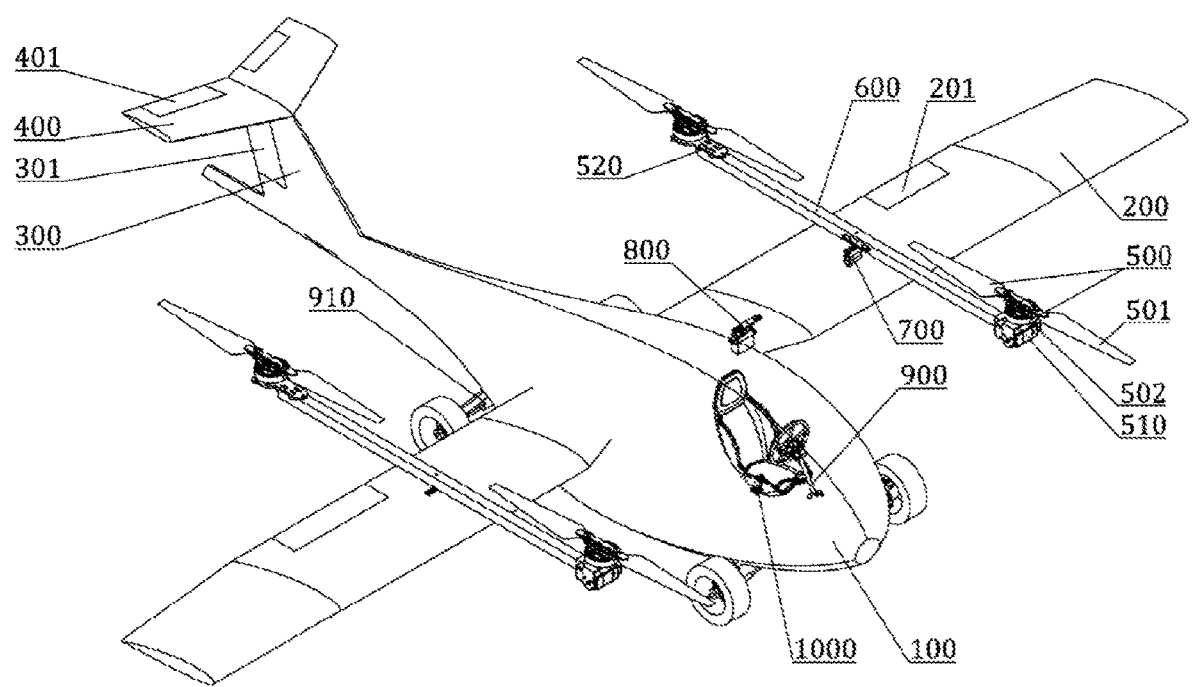
FIG. 1 is an isometric view of the flying vehicle in a vertical take-off and landing state in a flight mode.
Figure 2:
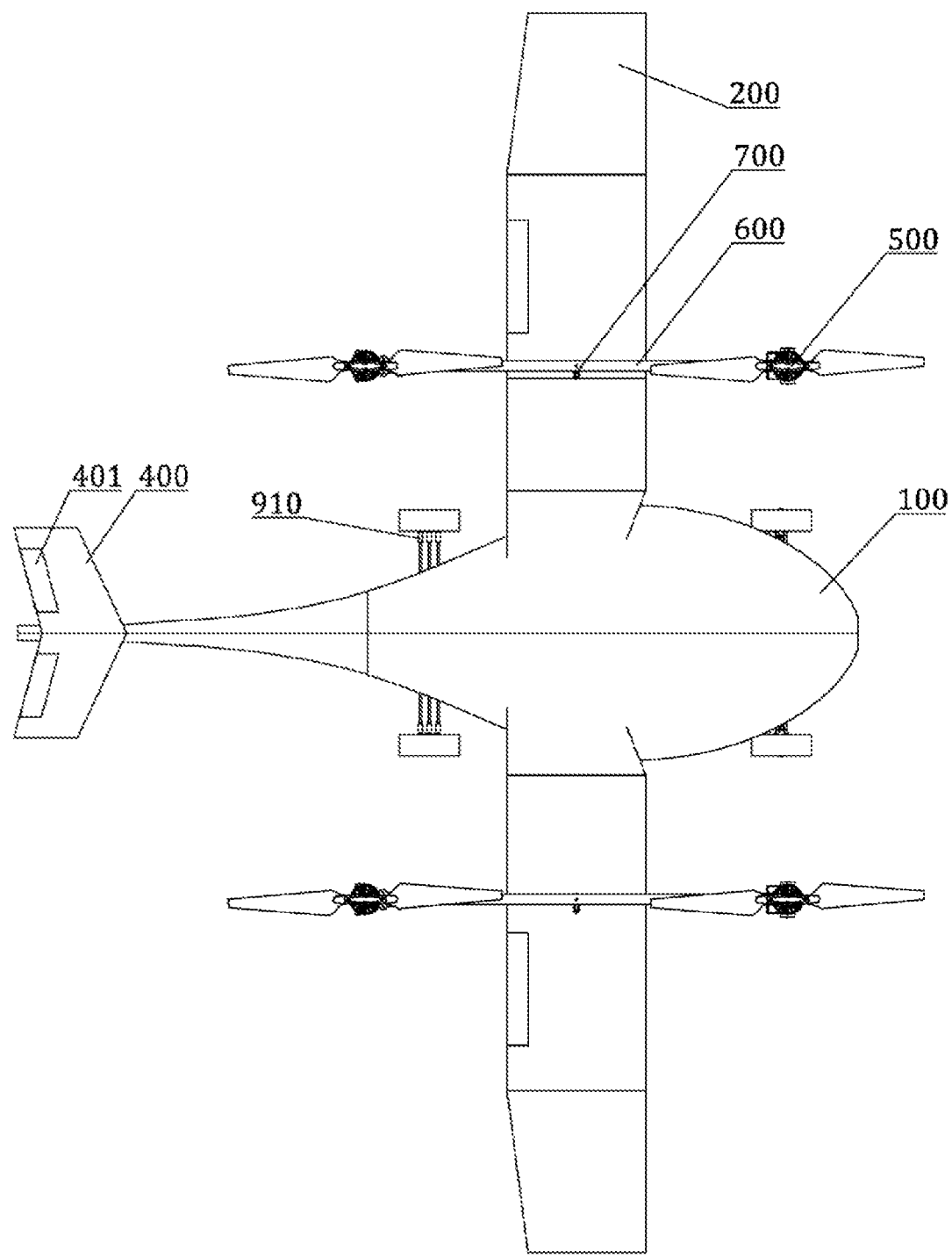
FIG. 2 is a top view of FIG. 1.
Figure 3:
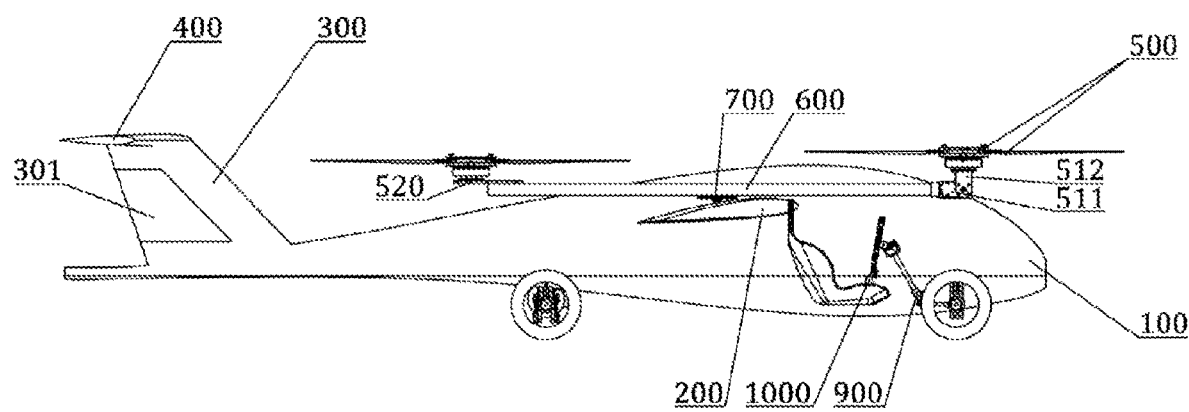
FIG. 3 is a front view of FIG. 1.
Figure 4:
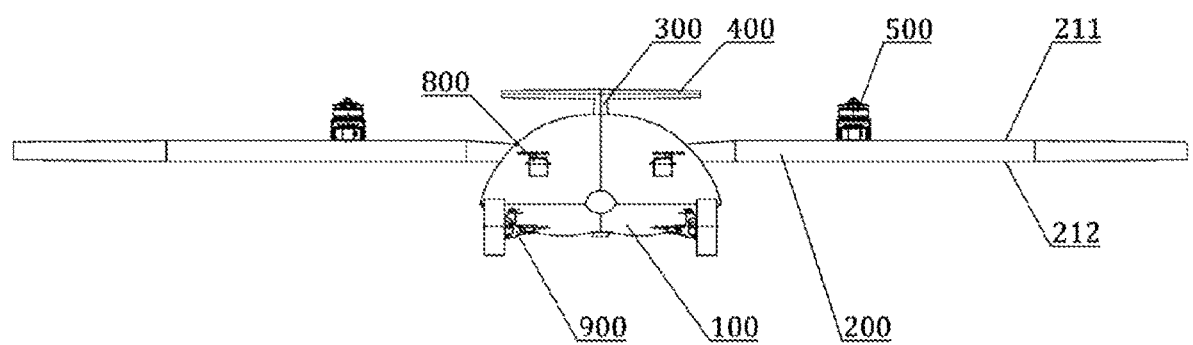
FIG. 4 is a left view of FIG. 1.
Figure 5:
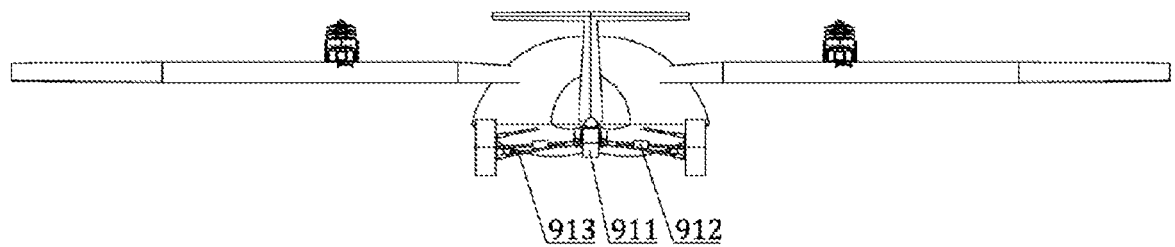
FIG. 5 is a right view of FIG. 1.

REFERENCE NUMERAL 100-vehicle body, 200-wing, 201-aileron, 211-upper surface of wing, 212-lower surface of wing, 300-vertical tail, 301-rudder, 400-horizontal tail, 401-elevator, 500-rotor assembly, 501-rotary wing, 502-motor, 503-rotor upper clip, 504-rotor lower clip, 510-tilting and rotating steering engine assembly, 511-tilting and rotating steering engine motor, 512-tilting and rotating steering engine U type bracket, 520-motor fixing plate, 600-rotor support (or front rotor support), 610-rear rotor support, 700-rotor support rotating mechanism, 72-support link rod, 73-support pulley, 711-link rod supporting shaft, 712-first link rod supporting pin, 713-third link rod supporting pin, 714-second link rod supporting pin, 715-support driven link rod, 716-support driving link rod, 721-support pulley shaft, 722-support driven pulley, 723-support driving pulley, 724-support pulley motor, 791-rotor support rotating steering engine, 792-straight arm of steering engine, 800-wing rotating mechanism, 82-wing link rod, 83-wing pulley, 811-link rod wing root shaft, 812-first wing link rod pin, 813-third wing link rod pin, 814-second wing link rod pin, 815-wing driven link rod, 816-wing driving link rod, 821-pulley wing root shaft, 822-wing driven pulley, 823-wing driving pulley, 824-wing pulley motor, 825-wing belt, 891-wing rotating steering engine, 892-straight arm of steering engine, 900-steering system, 901-steering wheel, 902-steering universal joint, 903-steering pull rod, 904-front wheel support rod, 905-front wheel, 910-power assembly, 911-rear wheel driving motor, 912-rear wheel driving shaft, 913-rear wheel support rod, 1000-flight control stick, 1001-stick switch, 1002-multi-rotor and fixed-wing flight state switch, 1003-grip, 1004-left yaw button, 1005-right yaw button, 1006-throttle lever, 1007-brake lever, 1010-flight control stick base, 1100-flight control signal line.

DETAILED DESCRIPTION OF EMBODIMENTS

The hybrid foldable system of wings and rotors of flying vehicle provided by the present disclosure includes: a vehicle body, two wings on both sides of the vehicle body, wing rotating mechanisms, rotor supports, rotor support rotating mechanisms, and rotor assemblies. The vehicle body has a streamlined appearance design, with a length of 6 meters, a width of 2 meters, and a height of 1.4 meters. The wings have a span of 8.8 meters and a chord length of 1 meter. They are located on the vehicle body near the head of the vehicle. The wing rotating mechanism uses a structure of combining a steering engine based on a gear set with a straight arm, the steering engine is fixedly connected to the vehicle body, and the straight arm of steering engine is fixedly connected to the wing. The rotor support is a rod with a total length of 3.5 meters and a square section with a side length of 75 mm; the rotor support rotating mechanism uses a structure of combining a steering engine based on a gear set with a straight arm, the steering engine is fixedly connected to the wing, and the straight arm of steering engine is fixedly connected to the rotor support; the rotor assemblies each consist of a 2-meter-diameter rotary wing and a 100-kilowatt motor, located at both ends of the rotor support. The rotor assemblies consist of two front rotor assemblies and two rear rotor assemblies. The front rotor assembly is fixedly connected to the rotor support through a tilting and rotating steering engine mechanism, and the rear rotor assembly is fixedly connected to the rotor support through a motor fixing plate.

The wing is driven by the wing rotating mechanism and can rotate around the vehicle body in a plane parallel to the ground plane, the wing end turns upward at an angle of 2 degrees; the rotor support is driven by the rotor rotating mechanism and can rotate around the wing in a plane parallel to the ground plane.

The present disclosure also provides a flying vehicle, which includes the hybrid foldable system of wings and rotors, a vertical wing and a horizontal wing arranged at the rear of the vehicle body, a vehicle steering system, a power assembly, and a flight control stick. Among them, the vertical wing and horizontal wing adopt a T-shaped layout and are located at the rear of the vehicle body; the vehicle steering system adopts a rack and pinion transmission structure and is located on the front axle of the vehicle, it includes: a steering wheel, a steering universal joint, a steering pull rod and front wheels; the power assembly is installed on the rear axle of the vehicle and includes: a rear wheel driving motor, a rear wheel driving shaft, and rear wheels.

Flying vehicle can be driven on the ground through the steering system and the power assembly. When the flying vehicle reaches the take-off location, the wings and the rotor assemblies can be deployed/expanded by rotating the wings and the rotor supports. Then, the flying vehicle enters the flight mode. Then, by starting the rotor motor to take off vertically, the flying vehicle enters the multi-rotor state. When the flying vehicle is hovering in the air, it can achieve forward flight by tilting and rotating the front rotor assemblies so that the rotary wing airfoil changes from parallel to the ground plane to perpendicular to the ground plane. At this time, the rear rotors gradually stop. Then, the flying vehicle enters the fixed-wing state. After arriving at the destination, the front rotor assembly airfoil changes from perpendicular to the ground to parallel to the ground, and the flying vehicle returns to the multi-rotor state. Next, the flying vehicle's rotor assemblies gradually reduce their speed, and the flying vehicle lands vertically. Finally, the wings of the flying vehicle are driven by the wing rotating mechanisms to retract to the inner sides of the vehicle body, and the rotor assemblies are driven by the rotor supports (driven by the rotor rotating mechanisms) to rotate on the upper surfaces of the wings and retract to the inner sides of the wings, and the flying vehicle returns to the vehicle mode.

The present disclosure will be further clarified below with reference to the accompanying drawings and specific embodiments. It should be understood that the following specific embodiments are only used to illustrate the present disclosure and are not intended to limit the scope of the present disclosure. It should be noted that, regarding the words "front", "rear", "left" and "right" used in the following description, the direction of the head of the vehicle is considered as the front, and the direction of the tail of the vehicle is considered as the rear, the left hand side is considered as the left and the right hand side is considered as the right, looking in the direction from the rear of the vehicle to the front of the vehicle, "upper" and "lower" refer to the directions in the drawings, and the words "inner" and "outer" refer to directions toward or away from the geometric center of a particular component, respectively.

This section will describe the specific embodiments of the present disclosure in detail. The preferred embodiments of the present disclosure are shown in the accompanying drawings. The function of the accompanying drawings is to supplement the description of the specification with graphics, so that people can intuitively and vividly understand various technical features and overall technical solution of the present disclosure, but they shall not be construed as limiting the scope of protection of the present disclosure.

In the description of the present disclosure, "several" means one or more, "plural"/"multiple" means two or more, "greater than, less than, more than", etc. are understood to exclude the original number, and "above, below, within", etc. are understood to include the original number. If there is a description of "first" or "second", it is only for the purpose of distinguishing technical features, and cannot be understood as indicating or implying the relative importance or implicitly indicating the number of indicated technical features or implicitly indicating the order of indicated technical features.

In the description of the present disclosure, unless otherwise explicitly limited, words such as "provide", "install", and "connect" should be understood in a broad sense. Those skilled in the art can reasonably determine the specific meaning of the above words in the present disclosure in combination with the specific content of the technical solution.

As shown in FIGS. 1-11, the hybrid foldable system of wings and rotors of flying vehicle of the present disclosure includes: a vehicle body, two wings on both sides of the vehicle body, wing rotating mechanisms, rotor supports, rotor support rotating mechanisms, and rotor assemblies. The wing is movably connected to the vehicle body; the wing rotating mechanism drives the wing to rotate from a state parallel to the longitudinal axis of the vehicle body to a state perpendicular to the longitudinal axis of the vehicle body, and can also be reversed back, that is, it can complete the conversion between the vehicle working state and the flight working state of the wing; or, the wing can also be fixed at any position during the rotation to complete the conversion between the vehicle working state and the flight working state of the wing; after completing the conversion between the vehicle working state and the flight working state, the wing and the vehicle body are relatively fixed and cannot move relative to each other. The rotor support is movably connected to the wing, by starting the rotor support rotating mechanism to rotate the rotor support, the rotation of the rotor support on the surface of the wing is realized, so that it can move from a state parallel to the longitudinal axis of the wing (the axis that is perpendicular to the longitudinal axis of the vehicle body when the wing unfolds/expands is the longitudinal axis of the wing) to a state perpendicular to the longitudinal axis of the wing, and can also be reversed back. When the wing rotates, the wing changes from a state that is parallel to the longitudinal axis of the vehicle body (vehicle working state) to a state that is perpendicular to the longitudinal axis of the vehicle body (flight working state), the rotor support rotates on the surface of the wing from a state parallel to the longitudinal axis of the wing to a state perpendicular to the longitudinal axis of the wing, and can also be reversed back; that is, the conversion between the vehicle working state and the flight working state of the rotor assembly can be completed; alternatively, the rotor support can also be fixed at any position during the rotation to complete the conversion between the vehicle working state and the flight working state of the rotor assembly. After completing the conversion between the vehicle working state and the flight working state, the rotor support and the wing are relatively fixed and cannot move relative to each other.

The wing surface (the surface of the wing) may be parallel to the longitudinal axis of the fuselage (the vehicle body), or it may be disposed at a certain angle to the longitudinal axis of the fuselage.

The rotor support may be parallel to the wing surface or at a certain angle to the wing surface.

The wings, wing rotating mechanisms and rotor assemblies are symmetrical about the longitudinal axis of the vehicle body.

As shown in FIG. 1, the wings on both sides are arranged on the vehicle body near the head of the vehicle, and one or more rotor supports can be installed on each wing.

The rotor support is an integral rotor support, and its rotation center point is set at any position between the two ends of the rotor support. In the embodiment shown in FIG. 1, the rotation center point is set in the middle of the rotor support. This structure is a preferred structure of the present disclosure. Optionally, one wing is provided with a front rotor support and a rear rotor support, which are arranged above the wing. The front rotor support and the rear rotor support form an integral support, sharing a center point of rotation, and the two ends of the rotor support are each provided with a rotor assembly.

Figure 21:
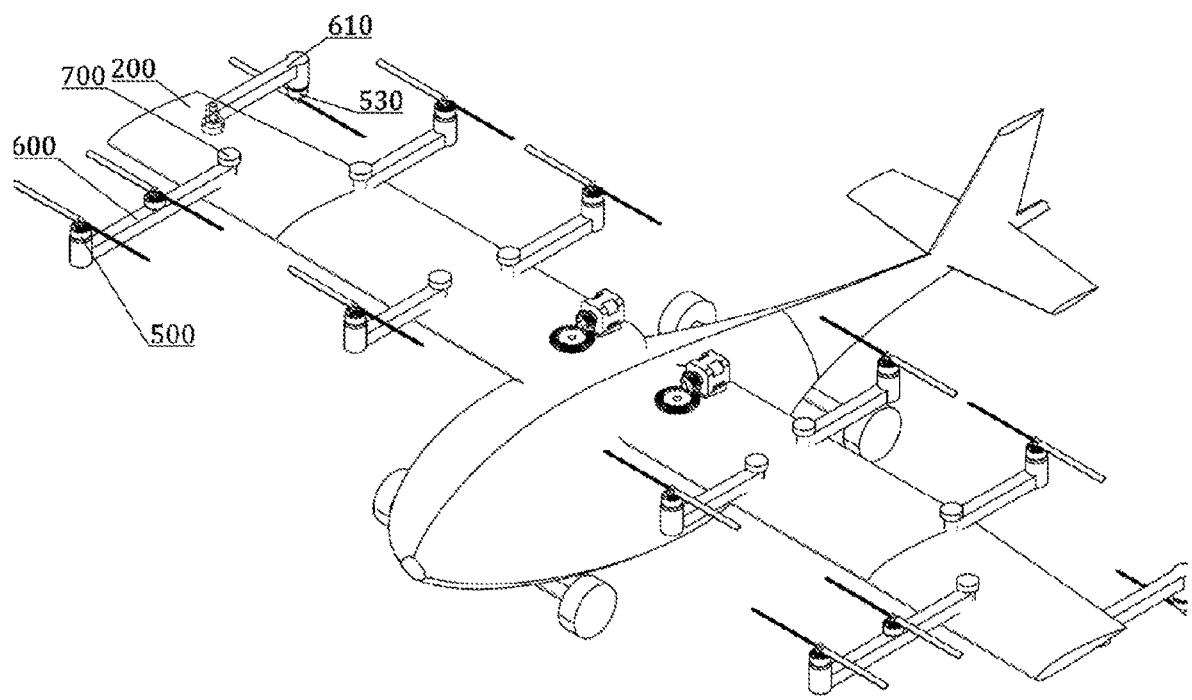
FIG. 21 is a structural view showing that multiple rotor supports are arranged on one wing and more than one (two) rotor is arranged on one rotor support.
Figure 22:
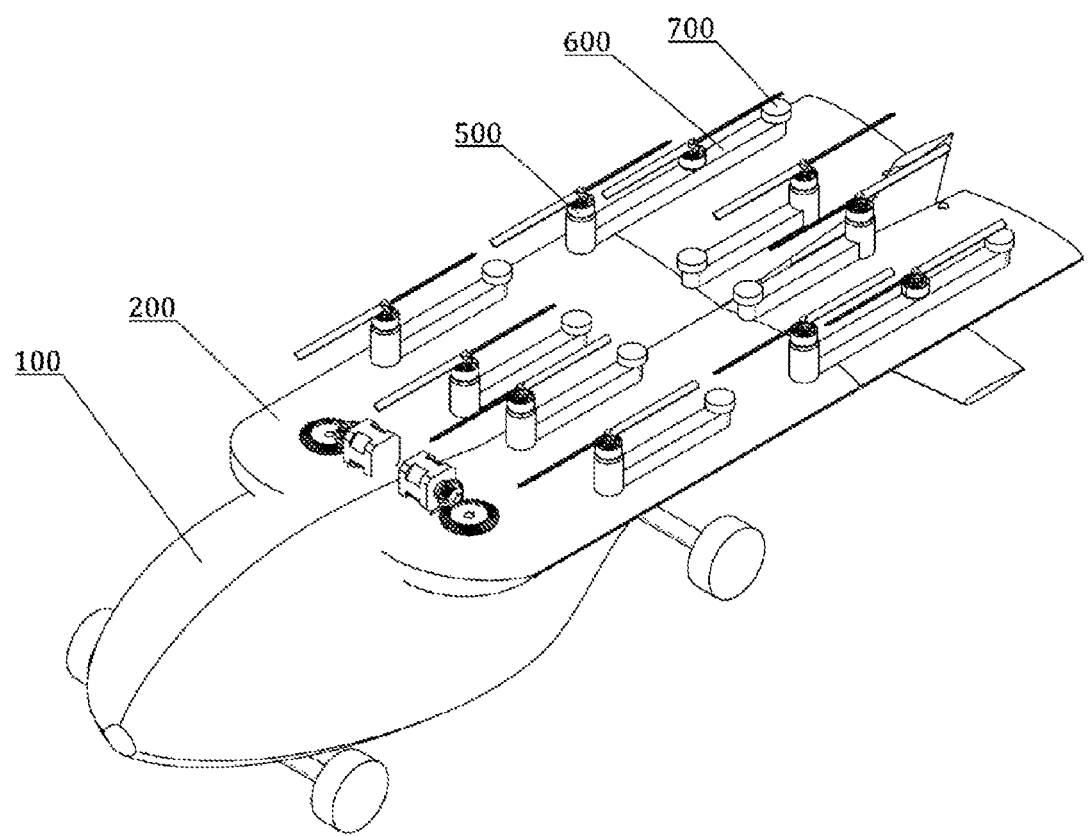
FIG. 22 is a state view of the flying vehicle in FIG. 21 showing the vehicle mode.

As shown in FIG. 21, the rotor support is divided into two parts, including front rotor supports and rear rotor supports. The two parts can share the rotation center point, and one ends of the two parts providing the rotation center point overlap; or alternatively, they can have their own rotation center point separately. As shown in FIG. 21, the rotor supports are in two sections, the front rotor supports and the rear rotor supports, and the lengths of the front rotor supports and the rear rotor supports may be equal or unequal. There are two front rotor supports and three rear rotor supports on one wing, which are arranged above and below the wing. The front rotor supports and the rear rotor supports have their own rotation axes and do not share the rotation center point. Each rotor support is provided with one or more rotors.

Figure 13:
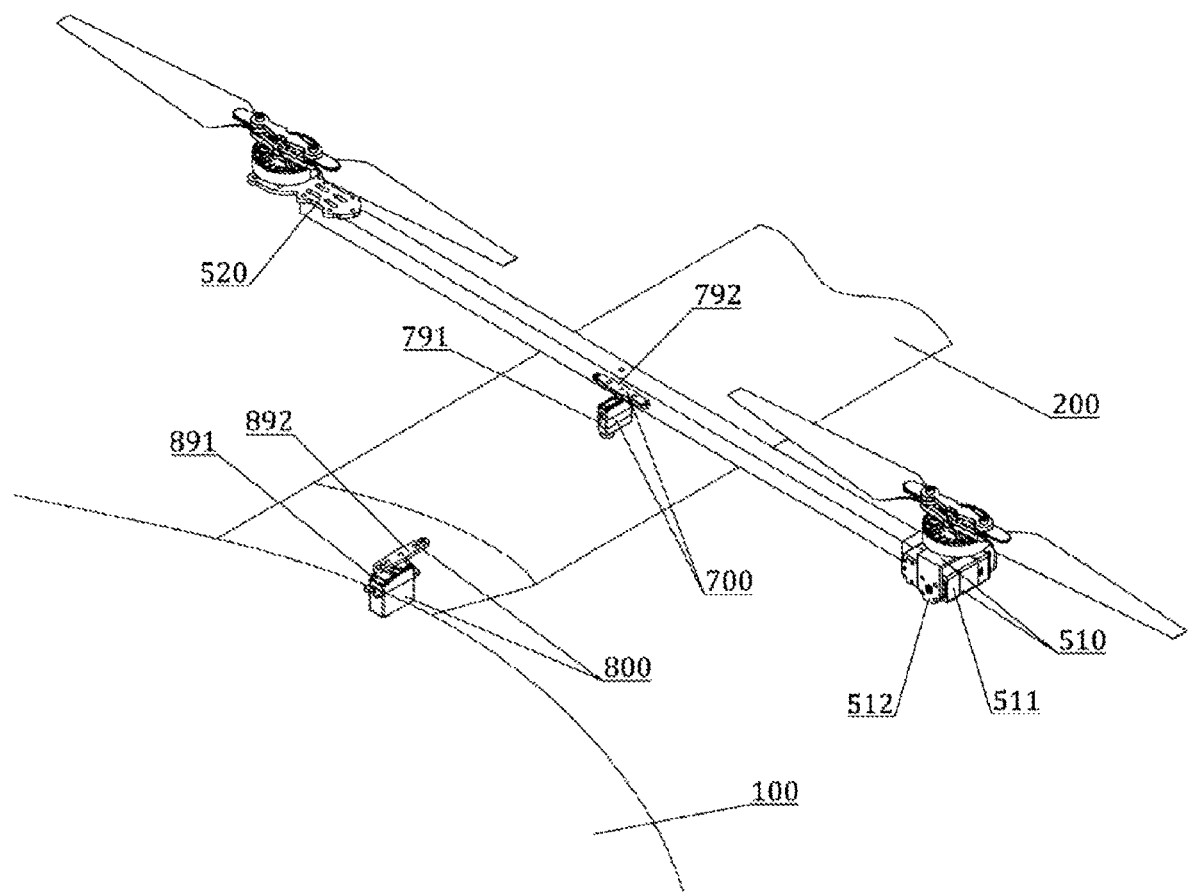
FIG. 13 is an isometric view of the wing rotating mechanisms and the rotor support rotating mechanisms.
Figure 18:
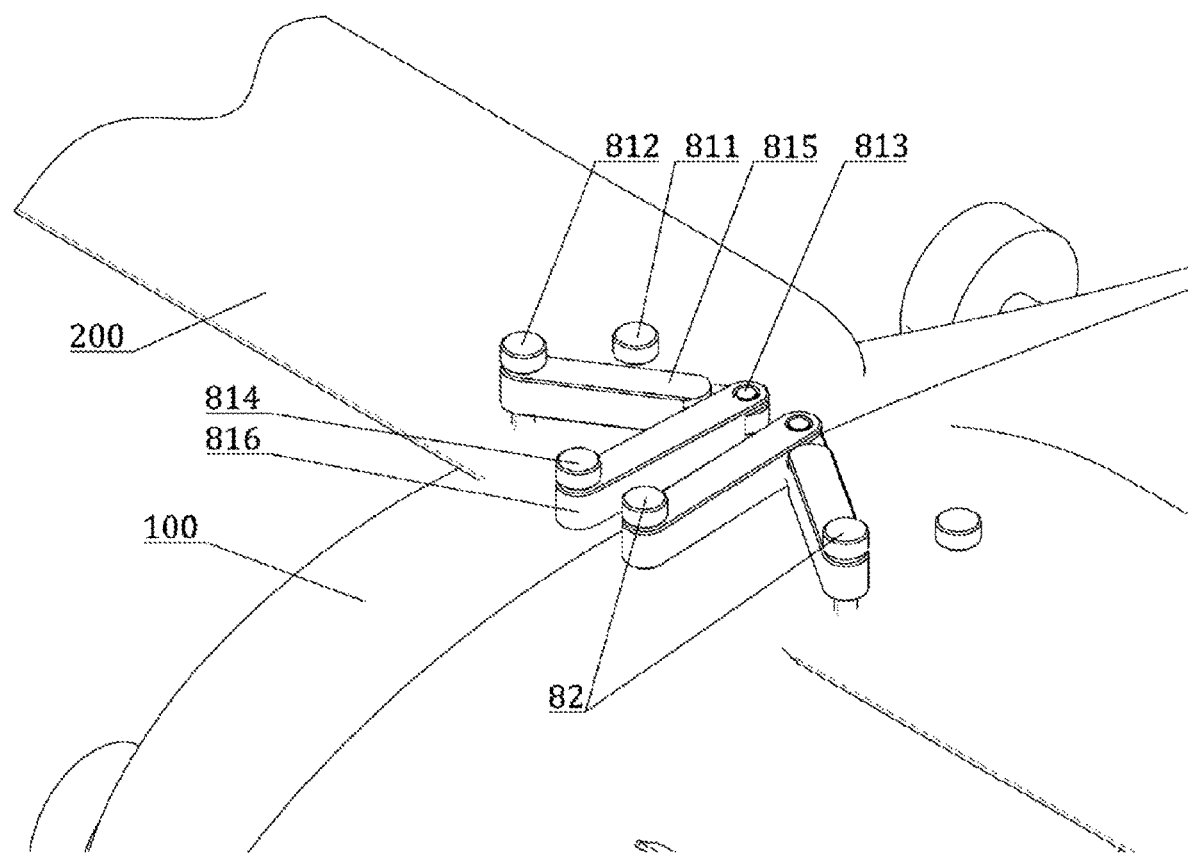
FIG. 18 is a structural view of link rods as the wing rotating mechanism.
Figure 20:
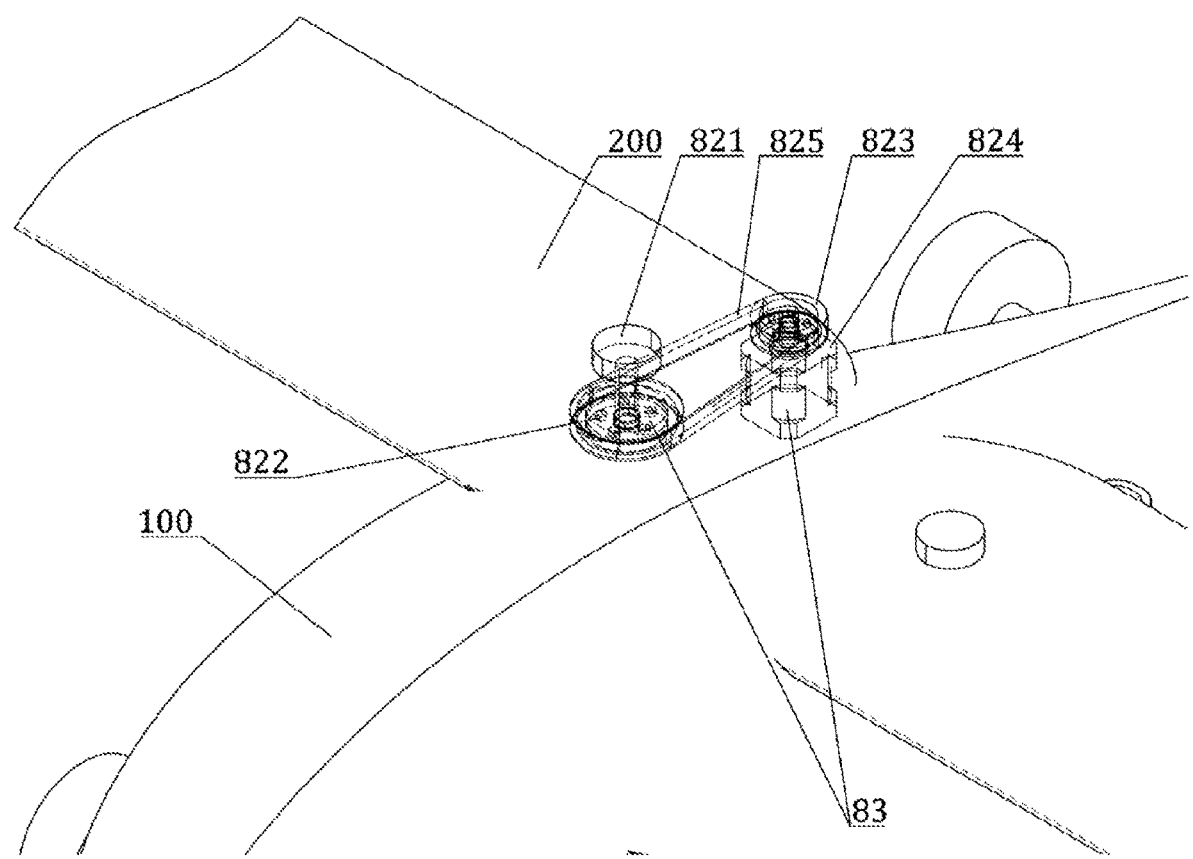
FIG. 20 is a structural view of a pulley mechanism as the wing rotating mechanism.

As shown in FIGS. 13, 18, and 20, the wing rotating mechanisms can drive the wings to rotate through a steering engine, a pin, a gear drive, a pulley drive, a chain drive, a link rod, or any combination thereof. By starting the wing rotating mechanisms the wings are driven to rotate to both sides of the vehicle body, or reversely rotate into the inner sides of the vehicle body, and can be fixed at any position during the rotation, completing the conversion between the wings' vehicle working state and flight working state.

Specifically, as shown in FIG. 13, the wing rotating mechanism is driven by a steering engine, and its structure and principle are as follows: the wing rotating mechanism consists of two parts: a wing rotating steering engine and a straight arm of steering engine. The steering engine can be regarded as an integration of the motor and the gear set, which can amplify the torque output by the motor. The steering engine is fixedly installed on the fuselage. The straight arm of steering engine is installed on the output shaft of the steering engine and is fixedly connected to the wing. When the output shaft of the steering engine rotates, the straight arm of steering engine drives the wing to rotate, herein the wing rotating steering engine is commercially available. This is the preferred version of the present disclosure.

Specifically, as shown in FIG. 18, the wing rotating mechanism is driven by link rods, its structure and principle are as follows: when using link rods as the wing rotating mechanism, the installation relationship is: the link rod wing root shaft is fixedly connected to the vehicle body. The wing driven link rod is fixed on the wing by revolving around the first wing link rod pin, and rotates around the first wing link rod pin. The wing driving link rod is fixed on the vehicle body through the second wing link rod pin and rotates around the second wing link rod pin. The wing driven link rod and the wing driving link rod are connected through the third wing link rod pin and rotate around the third wing link rod pin.

Working principle: when the wing driving link rod rotates around the second wing link rod pin, it drives the wing driven link rod through the third wing link rod pin, to drive the wing to rotate around the link rod wing root shaft above the vehicle body. The rotation angle of the wing driving link rod around the second wing link rod pin controls the angle of rotation of the wing around the link rod wing root shaft, thereby controlling the wings to be retracted to the inner sides of the vehicle body or expanded to both sides of the vehicle body.

Specifically, as shown in FIG. 20, the wing rotating mechanism is driven by a pulley mechanism, its structure and principle are as follows: when a pulley mechanism is used as the wing rotating mechanism, the installation relationship is: the pulley wing root shaft is fixedly connected to the vehicle body. The wing is fixedly connected to the wing driven pulley and rotates around the pulley wing root shaft above the vehicle body. The wing driven pulley and the wing driving pulley convey the rotational motion through the wing belt. The wing driving pulley is fixed to the output shaft of the wing pulley motor. The wing pulley motor is fixed to the vehicle body.

Working principle: the wing pulley motor is tightly connected to the vehicle body so that they remain relatively motionless. When the wing pulley motor rotates, it will drive the wing driving pulley to rotate. The wing driving pulley conveys the rotational motion to the wing driven pulley through the wing belt. Because the wing and the wing driven pulley are fixedly connected, they rotate together around the pulley wing root shaft above the vehicle body. Therefore, when the wing pulley motor rotates, it will drive the wing to rotate around the pulley wing root shaft through the belt transmission mechanism. The rotation angle is controlled by the wing pulley motor, thereby controlling the wings to retract to the inner sides of the vehicle body or expand to both sides of the vehicle body.

Figure 17:
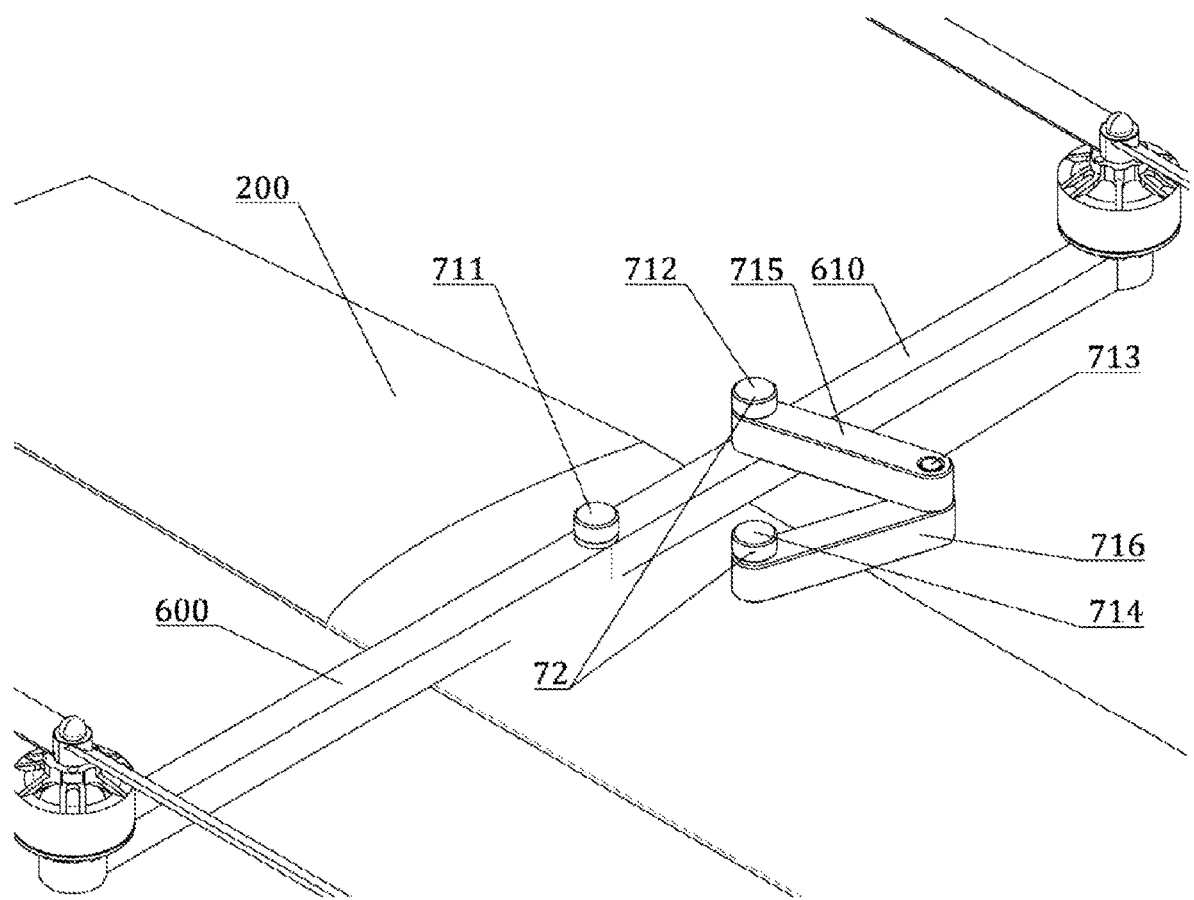
FIG. 17 is a structural view of link rods as the rotor support rotating mechanism.
Figure 19:
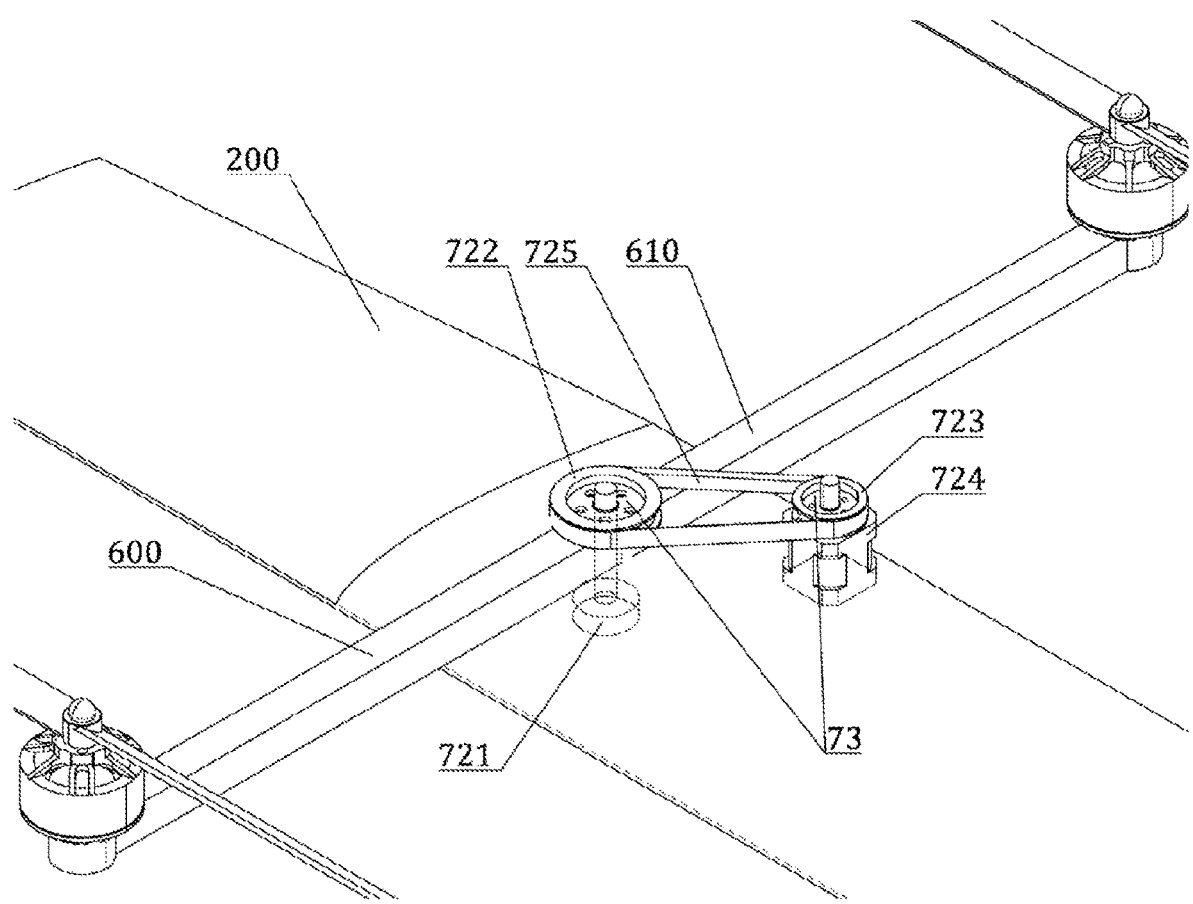
FIG. 19 is a structural view of a pulley mechanism as the rotor support rotating mechanism.

As shown in FIGS. 13, 17, and 19, the rotor support rotating mechanism drives the rotor support to rotate through a steering engine, a pin, a gear drive, a pulley mechanism drive, a chain drive or a link rod, or any combination thereof. By starting the rotor support rotating mechanism to rotate the rotor support, the rotation of the rotor support on the wing surface is realized. The rotor support is optionally a rod.

Specifically, as shown in FIG. 13, the rotor support rotating mechanism is driven by a steering engine, its structure and principle are as follows: the rotor support rotating mechanism consists of two parts: a rotor support rotating steering engine and a straight arm of steering engine. The steering engine can be regarded as an integration of the motor and the gear set, which can amplify the torque output by the motor. The steering engine is fixedly mounted on the wing. The straight arm of steering engine is installed on the output shaft of the steering engine and is fixedly connected to the rotor support. When the output shaft of the steering engine rotates, the straight arm of steering engine drives the rotor support to rotate, herein the rotor support rotating steering engine is commercially available. This solution is the preferred version of the present disclosure.

Specifically, as shown in FIG. 17, the rotor support rotating mechanism is driven by link rods, its structure and principle are as follows: when using link rods as the rotor support rotating mechanism, the installation relationship is: the front rotor support and the rear rotor support are fixed above the wing. The link rod supporting shaft is fixedly connected to the wing. The support driven link rod is fixed to the rear rotor support by revolving around the first link rod supporting pin, and rotates around the first link rod supporting pin. The support driving link rod is fixed to the wing through the second link rod supporting pin and rotates around the second link rod supporting pin. The support driven link rod and the support driving link rod are connected through the third link rod supporting pin and rotate around the third link rod supporting pin.

Working principle: when the support driving link rod rotates around the second link rod supporting pin, it drives the support driven link rod through the third link rod supporting pin, to drive the rear rotor support and the front rotor support to rotate around the link rod supporting shaft above the wing. The rotation angle of the support driving link rod around the second link rod supporting pin controls the rotation angle of the front rotor support and the rear rotor support around the link rod supporting shaft, thereby controlling the front rotor support and the rear rotor support to retract to the inner sides of the wing or expand to both sides of the wing.

Specifically, as shown in FIG. 19, the rotor support rotating mechanism is driven by a pulley mechanism, its structure and principle are as follows: when a pulley mechanism is used as the rotor support rotating mechanism, the installation relationship is: the front rotor support and the rear rotor support are fixedly connected above on the wing. The support pulley shaft is fixedly connected to the wing. The front rotor support and the rear rotor support are fixedly connected to the support driven pulley, and jointly rotate around the support pulley shaft above the wing. The support driven pulley and the support driving pulley convey the rotational motion through the support belt. The support driving pulley is fixed to the output shaft of the support pulley motor. The support pulley motor is fixed to the wing.

Working principle: The support pulley motor is tightly connected to the wing so that they remain relatively motionless. When the support pulley motor rotates, it will drive the support driving pulley to rotate. The support driving pulley conveys the rotational motion to the support driven pulley through the support belt. Because the front rotor support and the rear rotor support are fixedly connected to the support driven pulley, they jointly rotate around the support pulley shaft above the wing. Therefore, when the support pulley motor rotates, the front rotor support and the rear rotor support will be driven to rotate around the support pulley shaft through the belt transmission mechanism. The rotation angle is controlled by the support pulley motor, thereby controlling the front rotor support and the rear rotor support to retract to the inner sides of the wing or expand to both sides of the wing.

Figure 16:
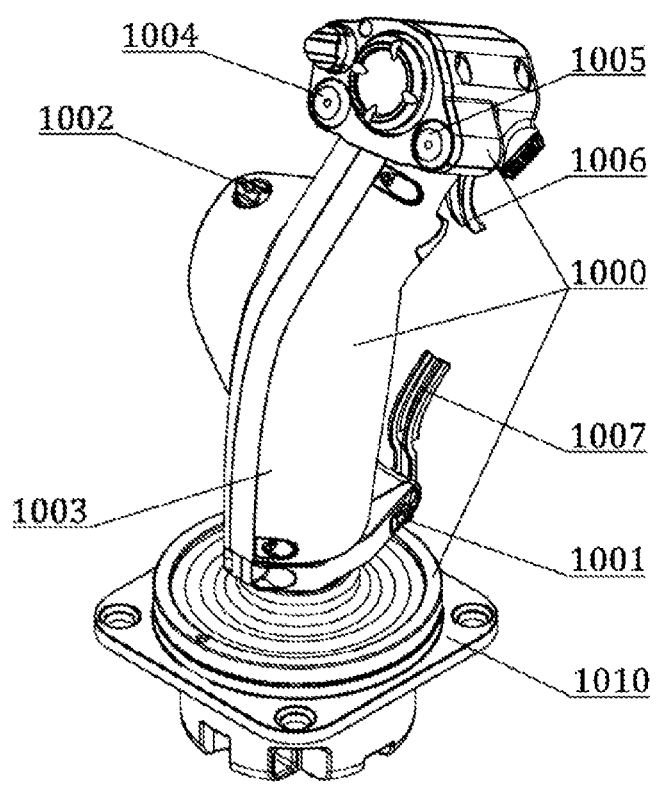
FIG. 16 is an isometric view of the flight control stick.

As shown in FIG. 16, the surface of the wing includes an upper surface and a lower surface, and the rotary wing is disposed above the upper surface of the wing or below the lower surface of the wing.

As an example, as shown in FIG. 1, the rotary wing assembly is disposed above the upper surface of the wing.

As an example, as shown in FIG. 21, the rotary wing assembly can also be disposed below the lower surface of the wing.

Figure 14:
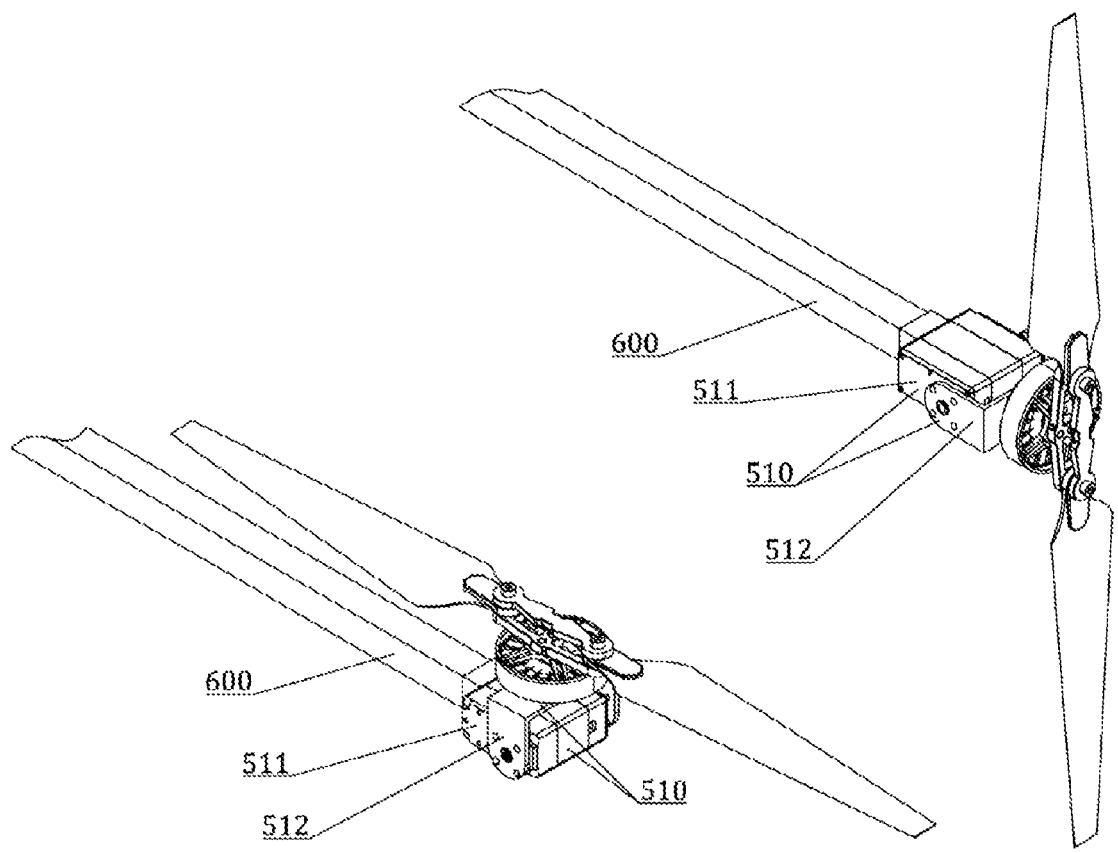
FIG. 14 is an isometric view of the rotor showing the tilting and rotating process.

As shown in FIG. 14, the rotor assembly is connected to the rotor support through a tilting and rotating steering engine U type bracket of the tilting and rotating steering engine assembly. The tilting and rotating steering engine motor can drive the tilting and rotating steering engine U type bracket to rotate within the range of 0 to 180°. In order to meet the requirements for the flying vehicle's lifting and moving-forward state, the rotor assembly is optionally tilted and rotated within a range of 90°, that is from a state parallel to the wing surface to a state perpendicular to the wing surface, and it can be fixed at any position during the tilting and rotating process (that is, the rotary wing surface of the rotor can be tilted and rotated within a range of 90°, from a state parallel to the wing surface to a state perpendicular to the wing surface, meeting the requirements for the flying vehicle's lifting and moving-forward state). The tilting and rotating steering engine is commercially available. This is the preferred version of the present disclosure.

As an example, as shown in FIG. 13, the rear rotor assembly is fixedly connected to the rotor support through a motor fixing plate. Therefore, the rear rotor assembly cannot be tilted and rotated. This example is a preferred example of the present disclosure.

The present disclosure also provides a flying vehicle, comprising the hybrid foldable system of wings and rotors according to any one of the above embodiments, wherein the flying vehicle further comprises a vertical wing and a horizontal wing arranged at a rear of the vehicle body, a vehicle steering system, a power assembly and a flight control operating mechanism; the steering system and the power assembly are installed at a bottom of the vehicle body; and the flight control stick is installed on the side of the seat in the cockpit.

Figure 12:
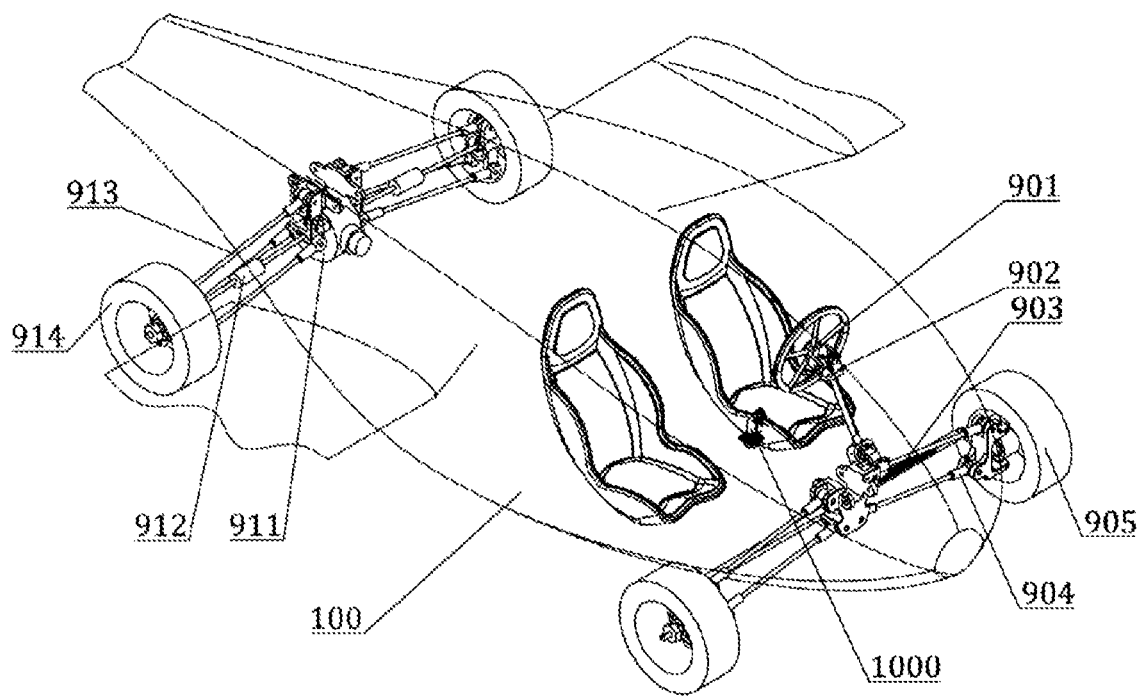
FIG. 12 is an isometric view of a layout of the steering system and the power assembly of the flying vehicle.

As shown in FIG. 12, the steering system of the flying vehicle is installed on the front axle of the wheels, and the power assembly is installed on the rear axle. The steering system includes a steering wheel, a steering universal joint, a steering pull rod and front wheels. The power assembly includes a rear wheel driving motor, a rear wheel driving shaft and a rear wheel support rod.

As shown in FIG. 12, the main driving position of the flying vehicle is equipped with a steering wheel and a flight control stick.

As shown in FIG. 14, the rotary wing surface of the rotor may be driven by the steering engine mechanism, so it can stay at any position during the tilting and rotating process.

Figure 7:
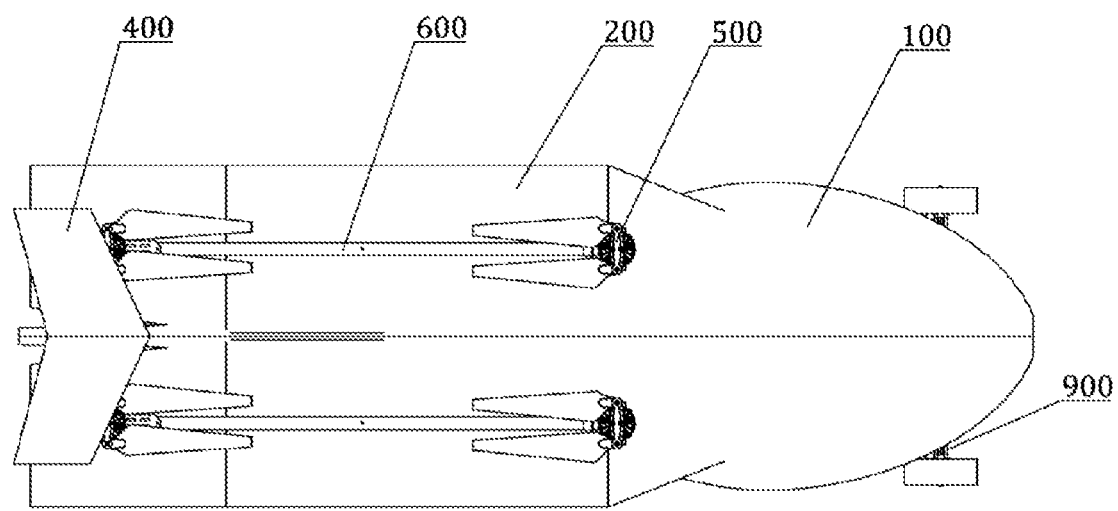
FIG. 7 is a top view of FIG. 6.
Figure 11:
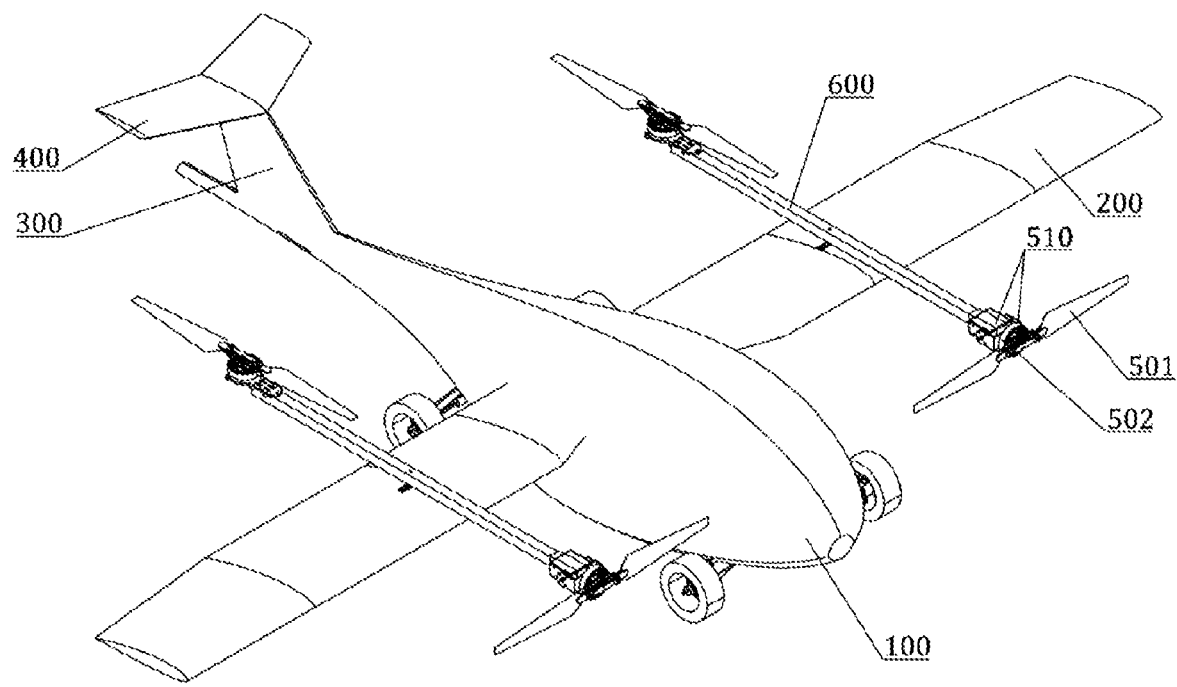
FIG. 11 is an isometric view of the flying vehicle in a forward flight state in a flight mode.

As shown in FIGS. 7 and 11, according to some embodiments of the present disclosure, on the premise that sufficient lift can be provided, the size of the rotary wing is determined by two factors. First, the diameter of the rotary wing should be smaller than the length of the rotor support; second, the radius of the tilting and rotating rotor should be smaller than the height of the tilting and rotating rotor from the ground. Optionally, in the embodiment of the present disclosure, the diameter of the rotary wing is less than 2.5 meters.

Figure 15:
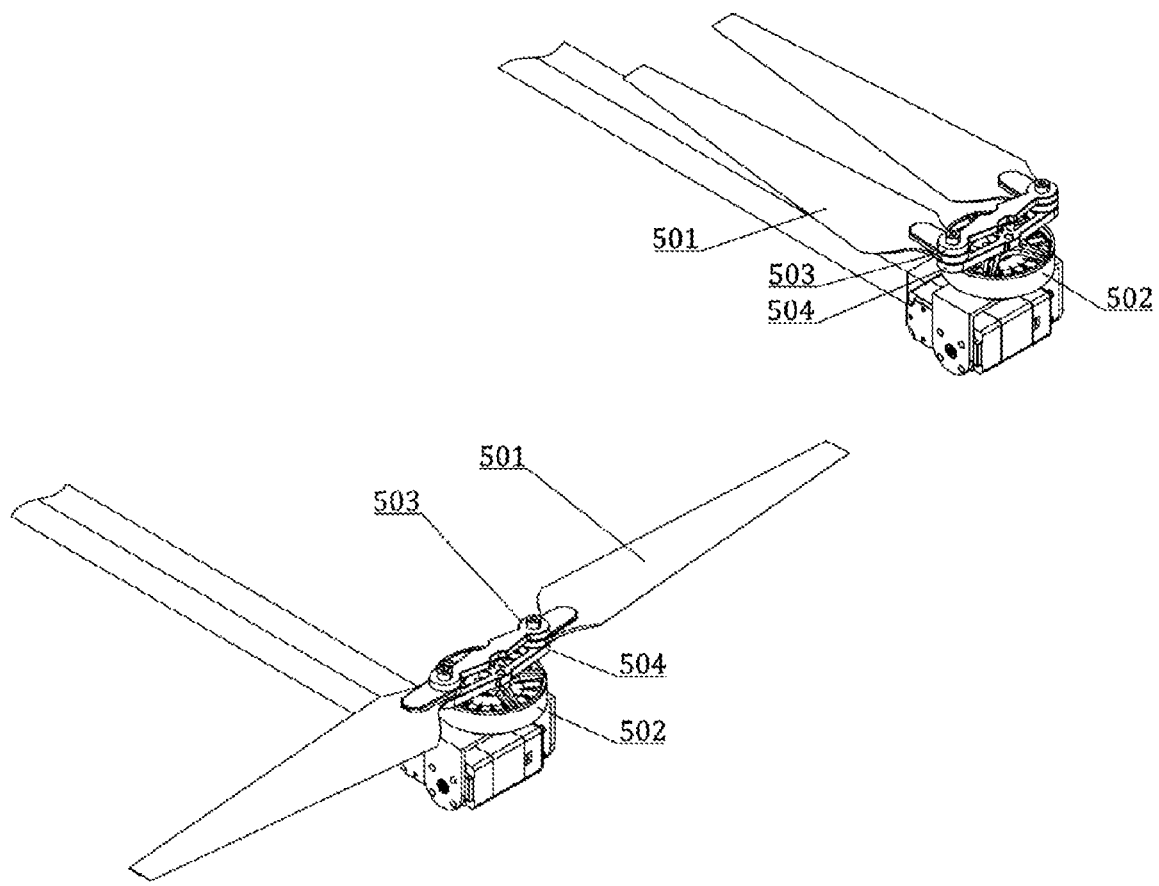
FIG. 15 is an isometric view of the rotor showing the folding process.

As shown in FIG. 15, in this embodiment, the rotor assembly can specifically include rotary wings, a rotor upper clip, a rotor lower clip and a motor. The two rotary wings are clamped by the upper and lower clips and tightened by fastening screws. The tightening force should prevent the rotary wings from ejecting, but at the same time it ensures that the rotary wings can rotate around the tightening screw. Since the total height of the flying vehicle is less than 1.7 meters, when the flying vehicle is ready to enter the vehicle mode, adults can fold the rotary wings on the ground to the folded state shown in FIG. 15. When the flying vehicle enters a take-off preparation state, the rotary wings can expand under the action of centrifugal force by relying on the torque output by the motor. When the rotor is folded to be in the same straight line as the rotor support, the rotor will not exceed the width of the vehicle body, and there will be no interference between adjacent rotors. At the same time, in order to avoid interference between adjacent rotors during operation, it is necessary to design the flying vehicle in such a way that the heights of adjacent rotary wings stagger, or sufficient distance between rotary wings is kept.

Figure 8:
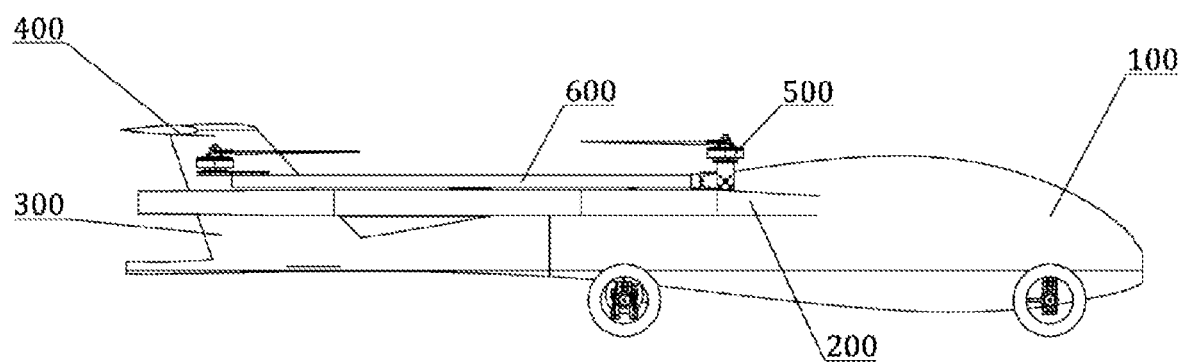
FIG. 8 is a front view of FIG. 6.
Figure 9:
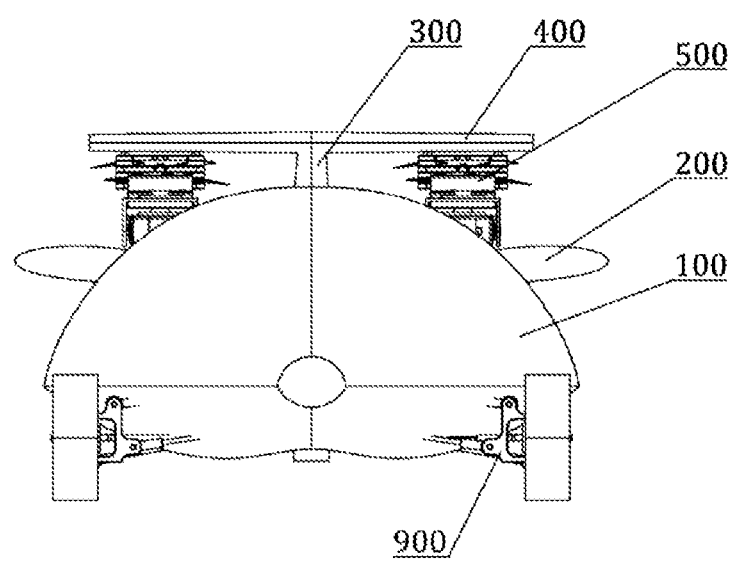
FIG. 9 is a left view of FIG. 6.
Figure 10:
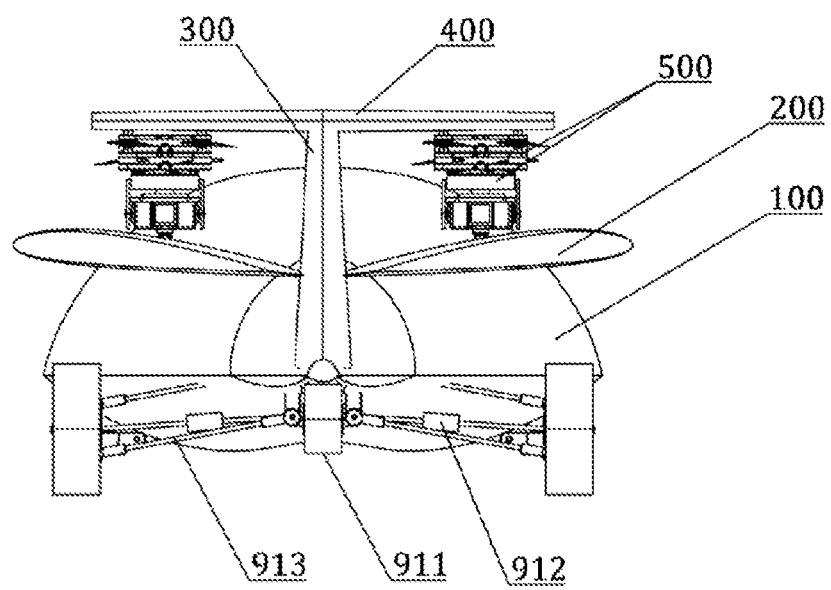
FIG. 10 is a right view of FIG. 6.

As shown in FIGS. 7, 8, and 9, the total length of the flying vehicle does not exceed 6 meters, the total width does not exceed 2 meters, the total height does not exceed 1.7 meters, the wingspan is less than 9 meters, and the chord length of the wing is less than 1.2 meters. Therefore, the flying vehicle according to the present disclosure meets the size requirements of passenger vehicles and can travel on urban roads.

Figure 6:
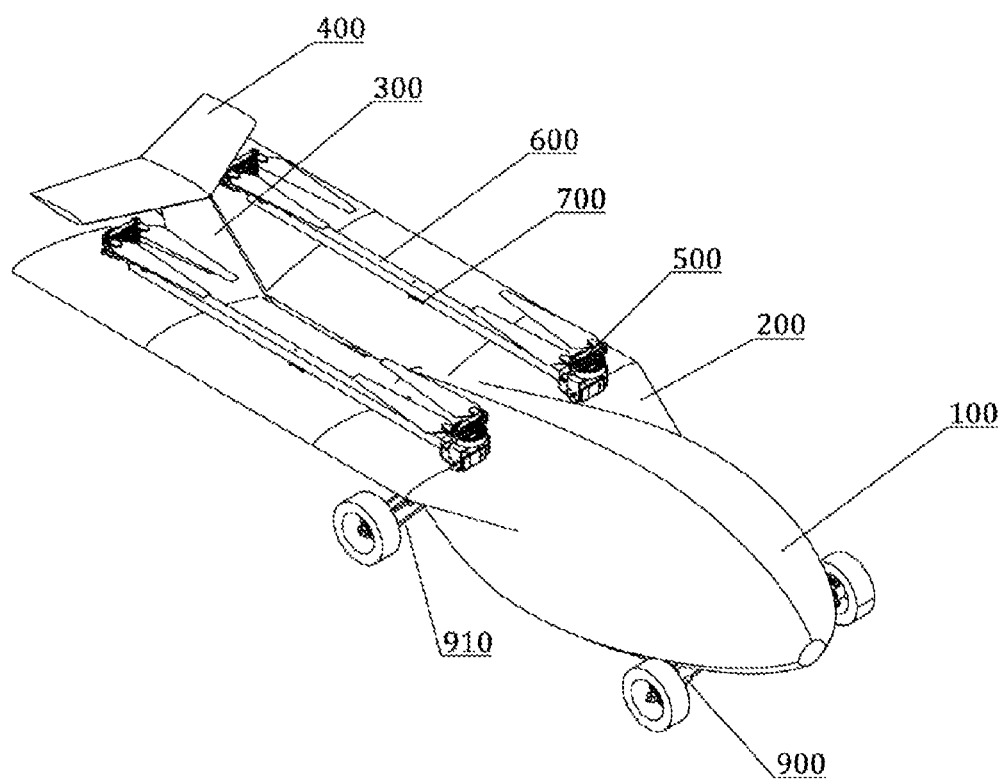
FIG. 6 is an isometric view of the flying vehicle in a driving mode.

As shown in FIG. 6, the working principle of the flying vehicle running on the ground is described as follows. In the default vehicle mode, the wings of the flying vehicle are rotated and retracted to the inner sides of the vehicle body, and the rotor supports drive the rotor assemblies to rotate and retract to the inner sides of the wings. Then, the driver enters the main driving position of the cockpit of the flying vehicle, starts the power assembly to drive the flying vehicle on the ground, and controls the driving direction of the flying vehicle through the steering wheel. When reaching the destination, the driver can turn off the power assembly and the flying vehicle will stop.

Figure 23:
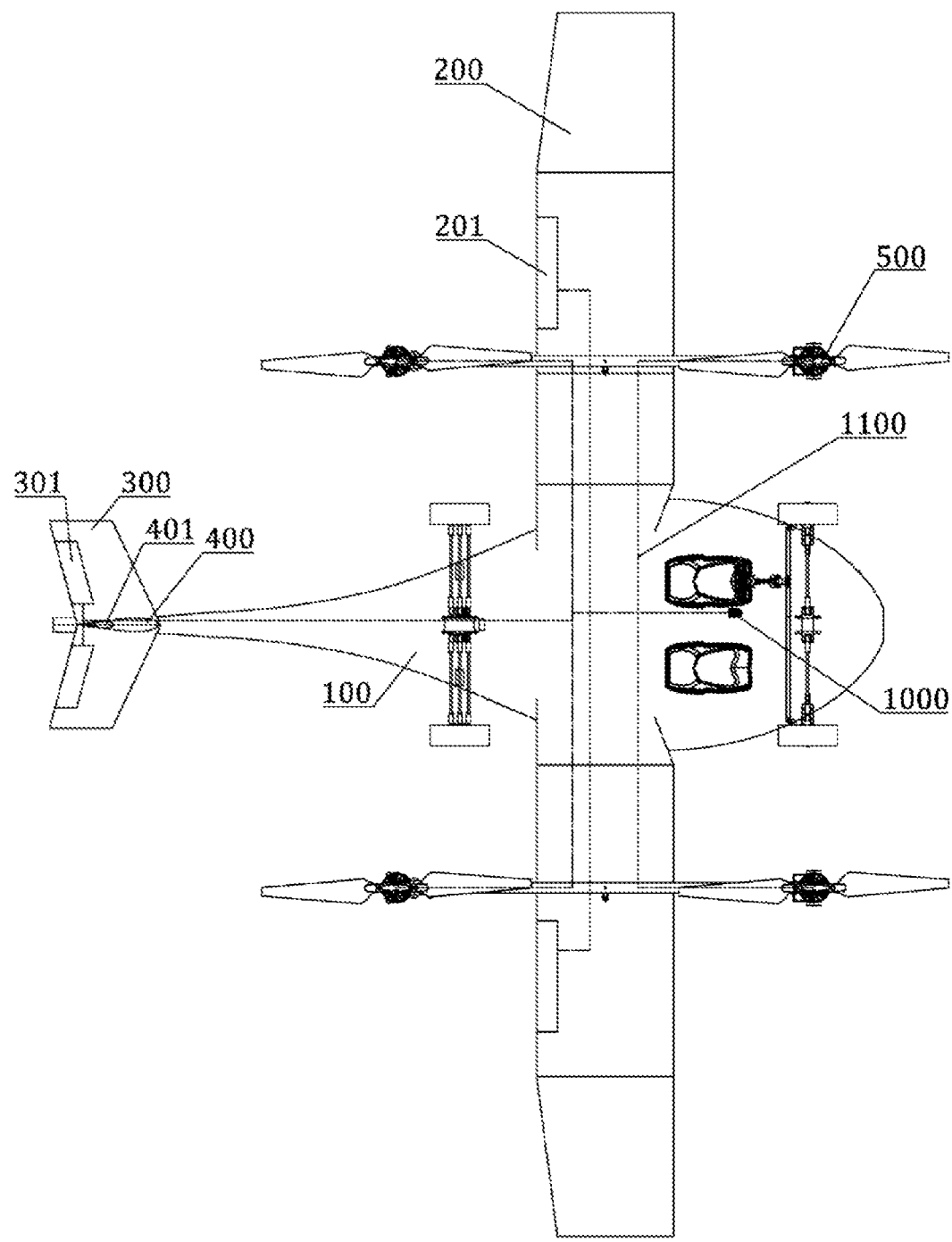
FIG. 23 is a flight control circuit distribution diagram.

After the flying vehicle switches to the flight mode, it is mainly controlled by the flight control stick, as shown in FIG. 16 and FIG. 23. The flight control stick mainly includes a stick switch, a multi-rotor and fixed-wing flight state switch, a grip, a left yaw button, a right yaw button, a throttle lever, a brake lever and a flight control stick base, the flight control stick is connected to a flight control signal line.

FIG. 23 is a flight control circuit distribution diagram according to an embodiment of the present disclosure. The two-dot dash line in the figure is the flight control signal line, which starts from the flight control stick and connects with the rotor assembly, the tilting and rotating steering engine assembly, the aileron of the wing, the horizontal tail rudder and the vertical tail elevator. The flight control signal line transmits the control signal of the flight control stick to the rotors, wings and tails respectively, thereby controlling the corresponding motors, steering engines and other driving mechanisms to achieve the conversion of the flight state. The specific control method is as follows: as shown in FIGS. 1 and 16, the working principle of the flying vehicle changing from the vehicle mode to the flight mode will be described as follows. After the driver enters the main driving position of the cockpit of the flying vehicle, he activates the flight control stick and turns off the vehicle mode by triggering the stick switch of the flight control stick. Then, the wings are driven by the wing rotating mechanisms and expanded from the inner sides of the vehicle body to both sides of the vehicle body. The wings expand from a state parallel to the longitudinal axis of the vehicle body to a state perpendicular to the longitudinal axis. At the same time, the rotor support is driven by the rotor support rotating mechanism, it drives the rotor assembly to expand from a position in the inner side of the wing to a position perpendicular to the wing. Optionally, the rotor supports are expanded orderly in the surface parallel to the upper surface of the wing, and the airfoils of the front rotor and rear rotor are parallel to the horizontal plane. The flying vehicle enters the take-off preparation state.

As shown in FIGS. 1 and 16, the working principle of the take-off process of the flying vehicle will be described. The driver flips the multi-rotor and fixed-wing flight state switch on the flight control stick to switch the flying vehicle to the multi-rotor state. The multi-rotor and fixed-wing flight state switch is a three-stage switch. The default middle position of the switch is an empty position. Turning to the left allows the flying vehicle to switch to the multi-rotor state, and turning to the right allows it to switch to the fixed-wing state. Then, the pilot triggers the throttle lever on the flight control stick, and the motor of the rotor assembly starts, then drives the rotor to rotate. When the rotary wing generates enough lift, the flying vehicle takes off vertically. The principle of landing of the flying vehicle is the reverse of the above process. The difference is that the driver reduces the rotor speed by triggering the brake lever on the flight control stick, causing the flying vehicle to gradually land.

As shown in FIGS. 1 and 16, the movement principle of the multi-rotor state of the flying vehicle in the air is shown. When the flying vehicle is hovering in the air, the driver can control the flight control stick, to control the flying vehicle to perform roll, pitch, and yaw actions in the multi-rotor state. When the grip of the flight control stick is pushed forward, the speed of the rear rotors of the flying vehicle is higher than that of the front rotors, so a forward lift difference is generated and the flying vehicle flies forward. On the contrary, the flying vehicle flies backwards. When the grip of the flight control stick is pushed to the left, the speed of the right rotors of the flying vehicle is higher than that of the left rotors, thus generating a lift difference to the left and the flying vehicle flies to the left. On the contrary, the flying vehicle flies to the right. When the left yaw button of the flight control stick is triggered, the speed of the left front rotor and right rear rotor of the flying vehicle is higher than that of the right front rotor and left rear rotor. Therefore, a lift difference is generated to deflect to the left, and the flying vehicle deflects to the left. On the contrary, when the right yaw button of the flight control stick is triggered, the flying vehicle will deflect to the right. The control principle of the multi-rotor state of the present disclosure belongs to the conventional technology. For details, please refer to pages 18-20 of the book "Quad-Rotor Aircraft Design and Implementation" written by Wang Rui and Ding Xiaoqing (ISBN: 9787302489641).

As shown in FIGS. 14 and 16, the flying vehicle changes from the multi-rotor state to the fixed-wing state. When the flying vehicle is hovering in the air, the driver can flip the multi-rotor and fixed-wing flight state switch on the flight control stick, and the flying vehicle gradually changes from the multi-rotor state to the fixed-wing state. At this time, driven by the steering engine mechanism, the two front rotors of the flying vehicle slowly transition from a state parallel to the horizontal plane to a state perpendicular to the horizontal plane, and then the lift direction changes from perpendicular to the horizontal plane to parallel to the horizontal plane, and the flying vehicle changes from the hovering state to slowly accelerate, and the wings gradually generate lift. When the lift generated by the wings is enough to overcome the gravity of the flying vehicle, the flying vehicle enters a fixed-wing flight state. At this time, the two rear rotors gradually stop, under the control of the motor lock, the rotor finally coincides with the rotor support in the vertical direction and stops rotating. The transformation of the flying vehicle from the fixed-wing state to the multi-rotor state is the reverse of the above process. The switch between the multi-rotor state and the fixed-wing state in the present disclosure belongs to the conventional technology. For details, please refer to pages 18-19 of the book "Flight Control of Tilting and Rotating Rotor Aircraft" written by Yang Jun, Wu Ximing, Fan Yonghua, and Yuan Bo (ISBN: 9787801837349).

As shown in FIGS. 11 and 16, the flying vehicle's fixed-wing flight principle is shown. In the fixed-wing state, when the grip of the flight control stick is pushed forward, the horizontal tail rudder of the flying vehicle deflects upward, and the flying vehicle dives and descends. On the contrary, the flying vehicle raises its head and climbs. When the grip of the flight control stick is pushed to the left, the aileron rudder surface of the wing of the flying vehicle deflects, the right aileron goes down, the left aileron goes up, and the flying vehicle flies tilted to the left. On the contrary, the flying vehicle flies tilted to the right. When the left yaw button on the flight control stick is triggered, the vertical tail rudder of the flying vehicle deflects to the left, and the flying vehicle yaws to the left. On the contrary, when the right yaw button of the flight control stick is triggered, the flying vehicle yaws to the right. The switch between the multi-rotor state and the fixed-wing state of the present disclosure belongs to the conventional technology. For details, please refer to pages 17-18 of the book "Application of Basic Knowledge of Civil Aviation" written by Jiang Qun and Wang Chun (ISBN: 9787118075588).

As shown in FIGS. 1, 6 and 16, the working principle of the flying vehicle changing from the flight mode to the vehicle mode is described as follows. After the flying vehicle lands vertically on the ground, the driver turns off the switch on the flight control stick and the flying vehicle enters the vehicle mode. At this time, the wings are driven by the wing rotating mechanisms and retracted from both sides of the vehicle body to the inner sides of the vehicle body. Optionally, the wings are retracted from the state perpendicular to the longitudinal axis of the vehicle body to the state parallel to the longitudinal axis. At the same time, the rotor support is driven by the rotor support rotating mechanism, it drives the rotor assembly to retract from the outer side of the wing to the inner side of the wing. Optionally, the rotor support is retracted orderly in the surface parallel to the upper surface of the wing. The flying vehicle enters the vehicle mode.

As shown in FIG. 12, at least two passengers can sit in the cockpit of the flying vehicle. A steering wheel and supporting steering system for the flying vehicle driving mode are installed in front of the main driver's seat, and a flight control stick and supporting flight control system are installed on the side of the main driver's seat.

As shown in FIG. 12, in the embodiment of the present disclosure, the flying vehicle adopts rear wheel drive mode, and the power assembly of the vehicle is connected to the wheels through a rear wheel driving shaft to drive the flying vehicle to travel on the ground.

INDUSTRIAL APPLICABILITY

The present disclosure cleverly utilizes the rotational deformation of the wings and rotor support structures, and proposes a flying vehicle layout that integrates fixed wings, multi-rotors and vehicle. The multi-rotor layout of the flying vehicle proposed by the present disclosure enables it to have vertical take-off and landing capabilities; the fixed-wing layout enables it to have long endurance; and the clever joint rotation of the wings and rotors makes the vehicle occupy a small area and comply with road traffic regulations. Therefore, this design has the characteristics of vertical take-off and landing, long endurance, and integration of aircraft and vehicle designs.

What is claimed is:

1. A hybrid foldable system of wings and rotary wing assemblies of a flying vehicle, comprising: a vehicle body, two folding wings on two sides of the vehicle body, folding wing rotating mechanisms, rotor supports, rotor support rotating mechanisms, and rotary wing assemblies,
    wherein the folding wings are movably connected to the vehicle body; the folding wings and the folding wing rotating mechanisms are symmetrically arranged on the two sides of the vehicle body; the folding wing rotating mechanisms are configured for driving the folding wings to rotate to extend away from the two sides of the vehicle body, or reversely rotate to retract towards the two sides of the vehicle body; the rotor supports are movably connected to the folding wings by means of the rotor support rotating mechanisms, and the rotary wing assemblies are arranged on the rotor supports; the rotor support rotating mechanisms are configured for driving each rotor support to extend away from respective folding wing, or reversely rotate to retract towards respective folding wing;
    wherein, each one of the folding wing rotating mechanisms comprises:
    a link rod folding wing root shaft that is fixedly connected to the vehicle body;
    a folding wing driven link rod fixed on the folding wing by a first folding wing link rod pin, and capable of rotating around the first folding wing link rod pin;
    a folding wing driving link rod fixed on the vehicle body through a second folding wing link rod pin and capable of rotating around the second folding wing link rod pin;
    wherein the folding wing driven link rod and the folding wing driving link rod are connected through a third folding wing link rod pin and are capable of rotating around the third folding wing link rod pin;
    wherein, when the folding wing driving link rod rotates around the second folding wing link rod pin, the folding wing driving link rod drives the folding wing driven link rod through the third folding wing link rod pin, which in turn drives the folding wing to rotate around the link rod folding wing root shaft above the vehicle body, and wherein a rotation angle of the folding wing driving link rod around the second folding wing link rod pin controls an angle of rotation of respective folding wing around the link rod folding wing root shaft, thereby controlling respective folding wing to be retracted towards the side of the vehicle body or extended away from the side of the vehicle body; and
    each one of the rotor support rotating mechanisms comprises a support driven pulley, a support driving pulley and a support pulley motor;
    wherein each one of the rotor support is divided into two parts, so that each one of the rotor support comprises a front rotor support and a rear rotor support;
    wherein the front rotor support and the rear rotor support are fixedly connected to the support driven pulley, and jointly rotate around a support driven pulley shaft;
    wherein the support driving pulley is fixed to an output shaft of the support pulley motor;
    wherein, the support pulley motor is fixed to respective folding wing so that the support pulley motor remains motionless relative to respective folding wing, and, when the support pulley motor rotates, the support pulley motor drives the support driving pulley to rotate; wherein, the support driving pulley conveys rotational motion to the support driven pulley through a support belt, causing the front rotor support and the rear rotor support to jointly rotate around the support pulley shaft above respective folding wing; and wherein a rotation angle is controlled by the support pulley motor, thereby controlling the front rotor support and the rear rotor support to retract towards respective folding wing or extend away from respective folding wing.

2. A flying vehicle, comprising the hybrid foldable system of wings and rotary wing assemblies according to claim 1, wherein the flying vehicle further comprises a vertical wing and a horizontal wing arranged at a rear of the vehicle body, a vehicle steering system, a power assembly and a flight control operating stick; wherein the vehicle steering system and the power assembly are installed at a bottom of the vehicle body; and the flight control operating stick is installed inside the vehicle body.

3. The flying vehicle of claim 2,
    wherein the rotor supports are integral rotor supports, and a rotation center point of each one of the rotor support is arranged at any position between two ends of each one of the rotor support;
    wherein the folding wing rotating mechanisms drive the folding wings to rotate to extend away from the two sides of the vehicle body, or reversely rotate to retract towards the two sides of the vehicle body, or stay at any intermediate position in between;
    wherein each one of the rotor support rotating mechanisms is configured to drive the rotation of respective rotor support on a surface of respective folding wing between a position parallel to a length of respective folding wing to a position orthogonal to the length of respective folding wing;

wherein the rotor support is disposed above an upper surface of respective folding wing or below a lower surface of respective folding wing;

wherein each one of the rotary wing assemblies comprises a rotor motor and a rotary wing; the rotary wing is fixedly connected to an output shaft of the rotor motor, and the rotor motor is installed on the rotor support through a fixed device or a rotatable device.

4. The flying vehicle of claim 3, wherein the vehicle comprises a steering wheel, two steerable front wheels and two rear wheels configured for driving on roadway traffic when the folding wings are in the retracted position, and wherein the flight control operating stick is configured for controlling flight when the folding wings are in the extended position;

wherein the flight control operating stick includes a stick switch, a multi-rotor and fixed-wing flight state switch, a grip, a left yaw button, a right yaw button, a throttle lever, a brake lever and a flight control stick base, and the flight control operating stick is connected to a flight control signal line.

5. The flying vehicle of claim 4, wherein the flight control signal line is configured to transmit a control signal of the flight control operating stick to the rotary wings, wings and tails to achieve conversion of a flight state.

6. The flying vehicle of claim 5, wherein at least two passengers can sit in a cockpit of the flying vehicle and wherein the steering wheel and a supporting steering system for a flying vehicle driving mode are installed in front of a main driver's seat, and wherein the flight control operating stick and a supporting flight control system are installed on a side of the main driver's seat.

7. The flying vehicle of claim 6, wherein the power assembly of the vehicle is connected to the wheels through a rear wheel driving shaft to drive the flying vehicle to travel on a ground surface.

* * * * *